(12) United States Patent
Agee

(10) Patent No.: US 7,079,480 B2
(45) Date of Patent: Jul. 18, 2006

(54) ENHANCING SECURITY AND EFFICIENCY OF WIRELESS COMMUNICATIONS THROUGH STRUCTURAL EMBEDDING

(76) Inventor: Brian G. Agee, 1596 Wawona Dr., San Jose, CA (US) 95125

( * ) Notice: Subject to any disclaimer, the term of this patent is extended or adjusted under 35 U.S.C. 154(b) by 1144 days.

(21) Appl. No.: 10/039,521

(22) Filed: Oct. 29, 2001

(65) Prior Publication Data
US 2002/0150109 A1   Oct. 17, 2002

Related U.S. Application Data

(60) Provisional application No. 60/244,103, filed on Oct. 28, 2000.

(51) Int. Cl.
*H04J 9/00* (2006.01)
*H04L 4/04* (2006.01)

(52) U.S. Cl. .................... 370/204; 370/205; 370/321; 370/337; 370/319; 370/347; 370/442; 370/458

(58) Field of Classification Search ................ 370/204, 370/205
See application file for complete search history.

(56) References Cited

U.S. PATENT DOCUMENTS

2005/0047480 A1 *  3/2005  Carbonari .................. 375/130

* cited by examiner

Primary Examiner—Chi Pham
Assistant Examiner—Christopher Grey
(74) Attorney, Agent, or Firm—George S Cole

(57) ABSTRACT

By embedding as a Physical Layer (PHY) Appliqué patterns (time, frequency, tone multiplexed, control signal, explicit network authentication, projective, other, or combined) on wireless electronic communications network (WECN) digital signal packets, and using a QRD-based auto-SCORE adaptation algorithm to maximize the signal-to-interference-and-noise ratio (SINR) attainable by multielement arrays over very small time-bandwidth products, differentiation and detection of signals from environmental noise (particularly from other or non-network signals) can be improved, allowing more compressed, secure, efficient network operations. By projecting the signal embedding onto a known linear subspace and using integrated transmit/receive structures, packet detection algorithms, and blind array adaptation algorithms, the WECN processes the data received with constant false-alarm rate, generalized, maximum-likelihood detectors and multilink signal estimation algorithms, based only on knowledge of the embedding pattern used at the transmit node. The resultant system provides PHY information-assured (PHY-IA) data transmission with improved network efficiency and security.

30 Claims, 20 Drawing Sheets

WECN Structural Embedding/Removal alternative converging embedded-signal-differentiation algorithms

Dominant-Mode Prediction

Solve: $\gamma \mathbf{u} = (\mathbf{R}^H \mathbf{R} - \mathbf{I}) \mathbf{u}$
$\|\mathbf{u}\| = 1$ ($L_2$ norm)
$\gamma$ = max eigenvalue

Optimization Algorithm

Initialize: $\mathbf{u} = r(M,M) [r^*(M,1) - 1]$
$\gamma = \|\mathbf{u}\|$ ($L_2$ norm)
$\mathbf{u} \leftarrow \mathbf{u}/\gamma$ Iterate: $\mathbf{v} = \mathbf{R}\mathbf{u}$
$\mathbf{u} \leftarrow \mathbf{R}^H \mathbf{v} - \mathbf{u}$
$\gamma = \|\mathbf{u}\|$ ($L_2$ norm)
$\mathbf{u} \leftarrow \mathbf{u}/\gamma$

Auto-SCORE

Solve: $v(\varphi) \mathbf{u} = \mathbf{S}(\varphi) \mathbf{u}$
$\mathbf{S}(\varphi) = 1/2(\mathbf{S} e^{j\varphi} + \mathbf{S}^H e^{-j\varphi})$
$\|\mathbf{u}\| = 1$ ($L_2$ norm)
$v(\varphi)$ = max eigenvalue
$\varphi = \arg\max_\varphi v(\varphi)$

Optimization Algorithm

Initialize: $\mathbf{u} = [s(m,M)]$
$v = \|\mathbf{u}\|$ ($L_2$ norm)
$\mathbf{u} \leftarrow \mathbf{u}/v$ Iterate: $\mathbf{v} = \mathbf{S}\mathbf{u}$
$\rho = 1/2 \operatorname{sign}\{\mathbf{v}^H \mathbf{u}\}$
$\mathbf{u} \leftarrow \rho \mathbf{v} + \rho^* \mathbf{S}^H \mathbf{u}$
$v = \|\mathbf{u}\|$ ($L_2$ norm)
$\mathbf{u} \leftarrow \mathbf{u}/v$ Finalize: $\varphi = \arg\{\rho\}$
$\gamma = v/(1-v)$

Figure 11

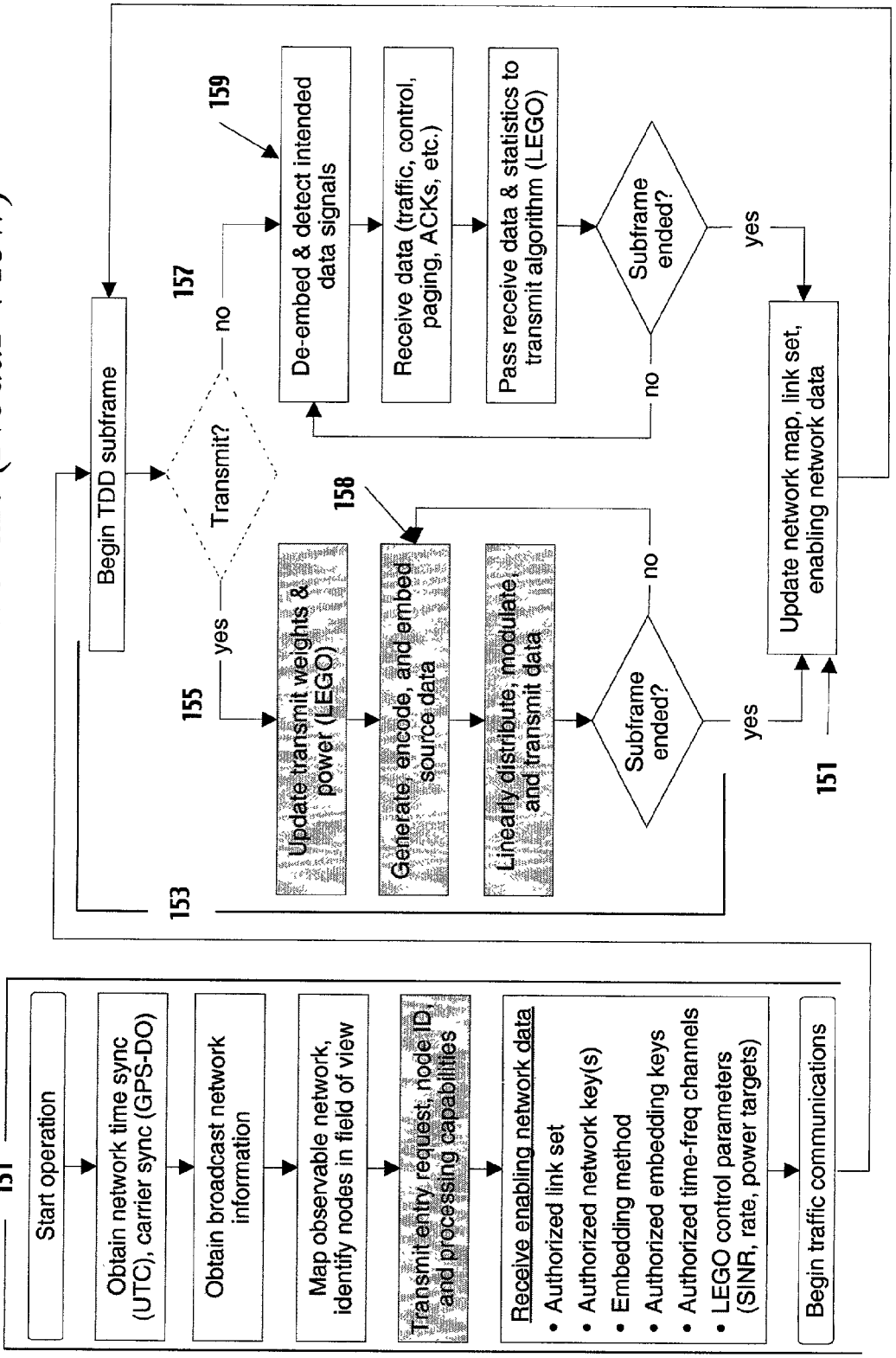

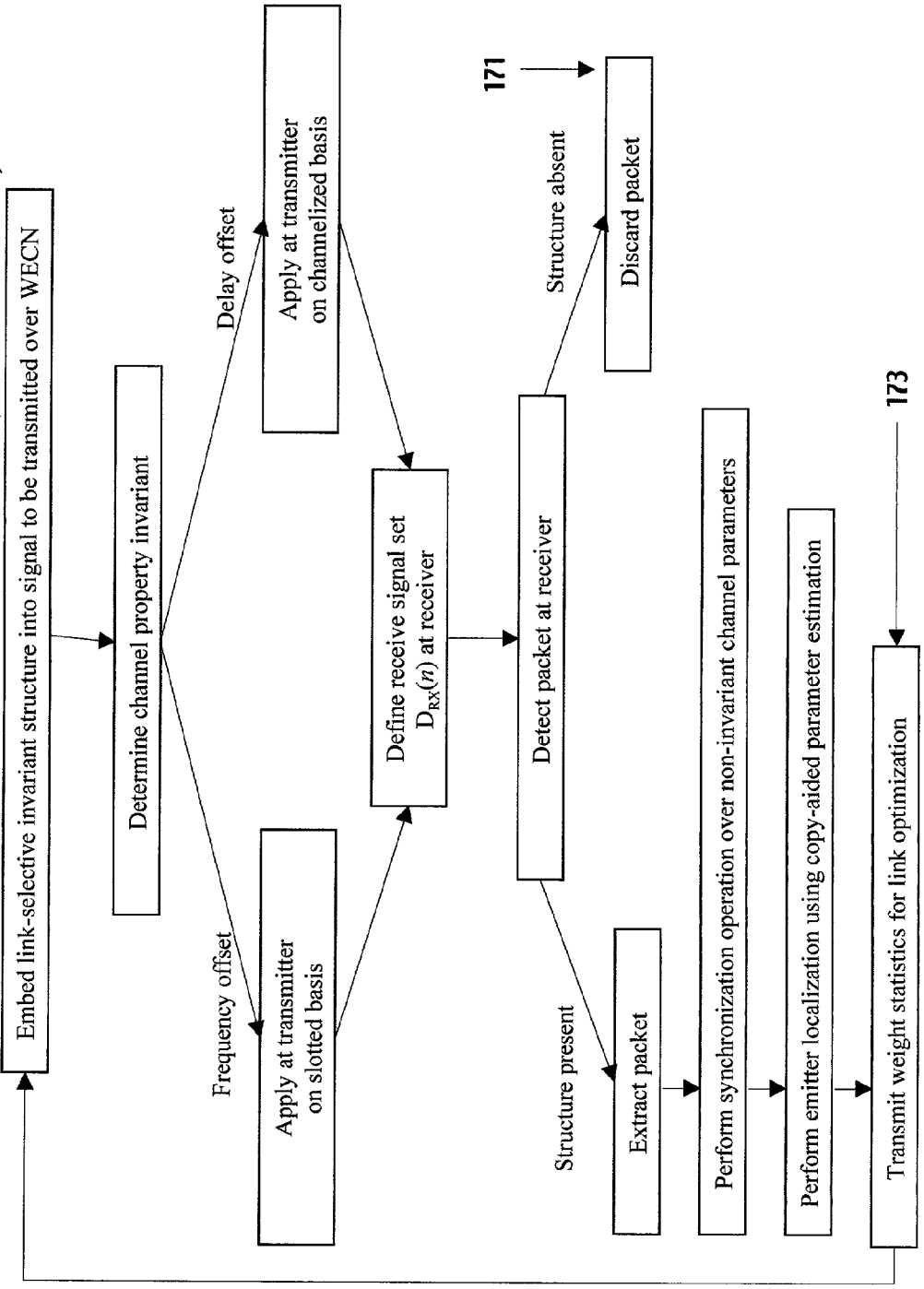

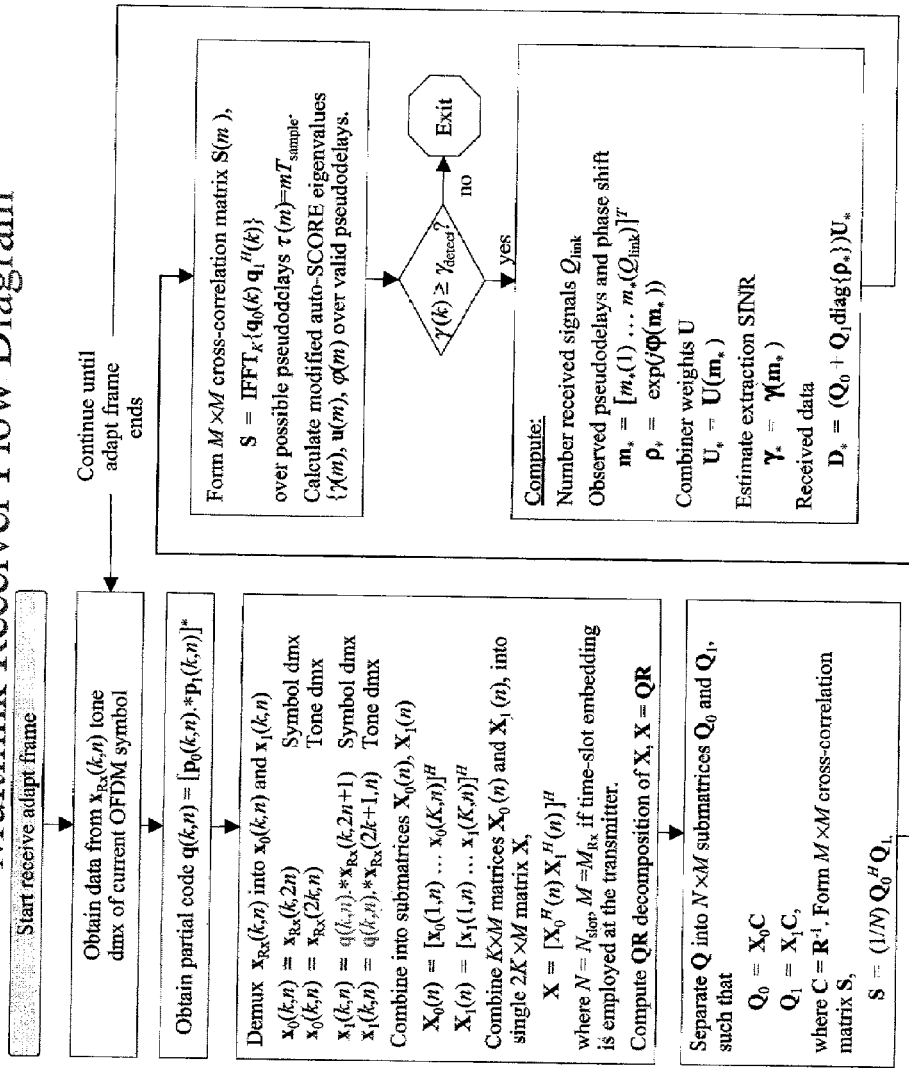

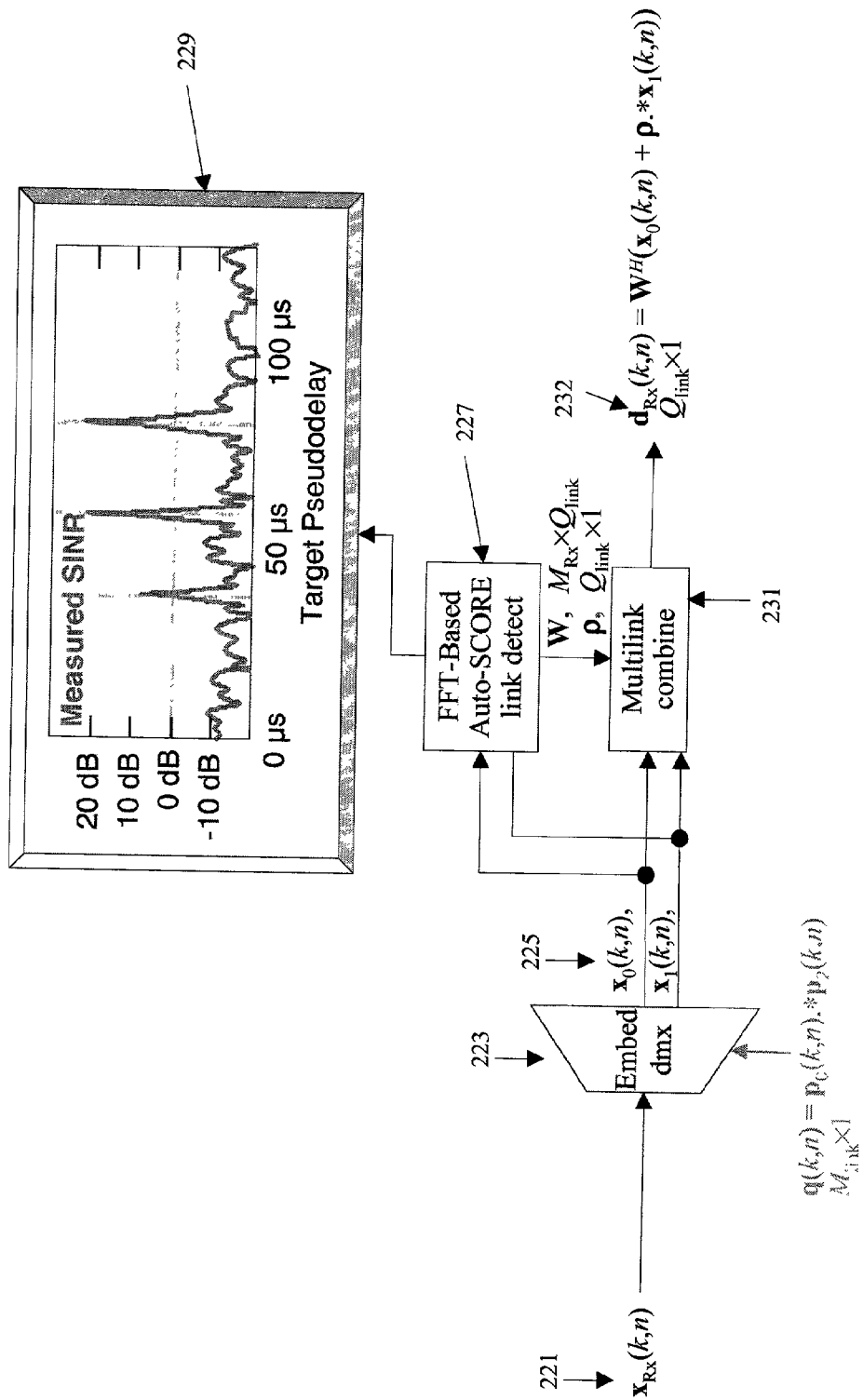

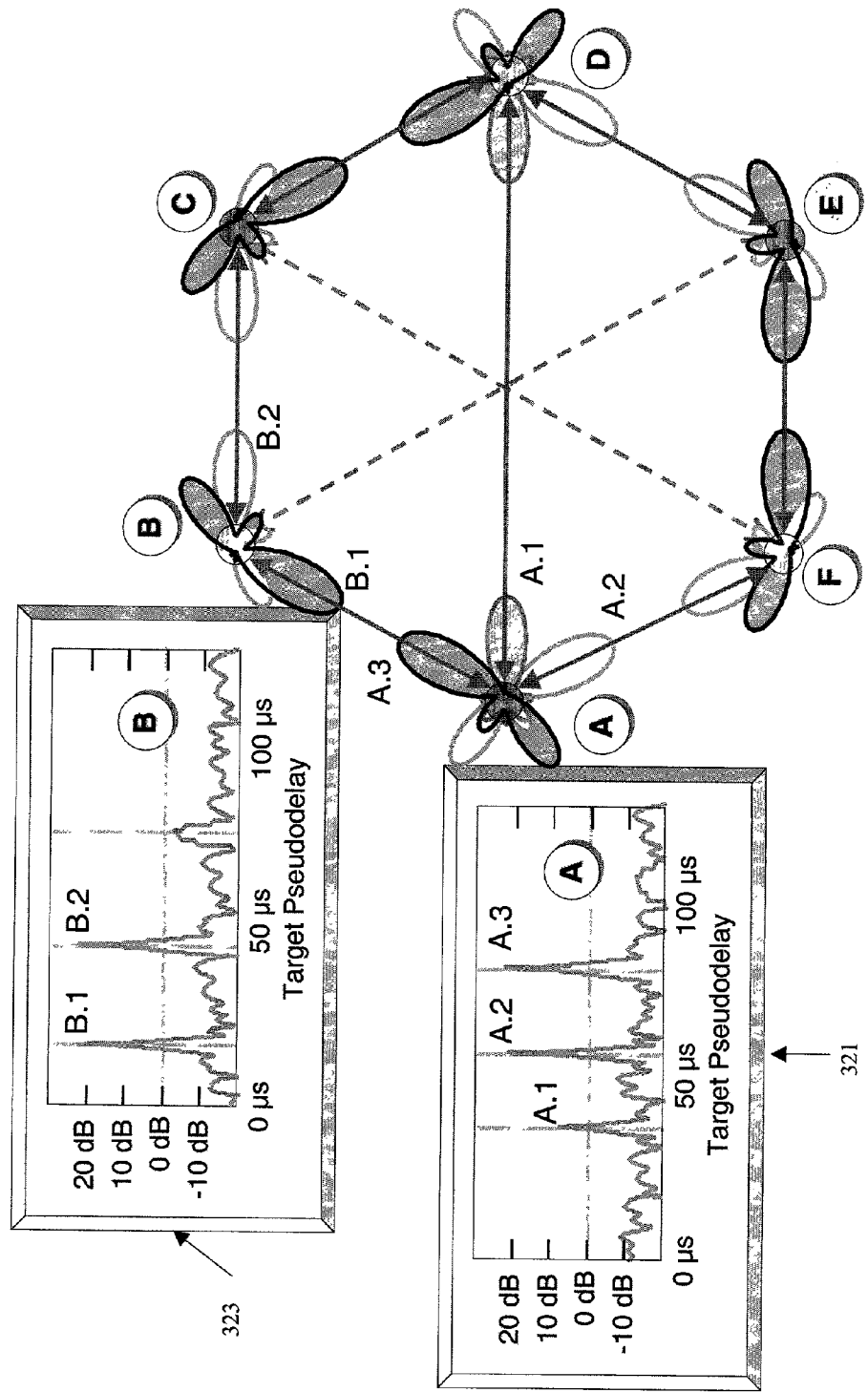

ENHANCING SECURITY AND EFFICIENCY OF WIRELESS COMMUNICATIONS THROUGH STRUCTURAL EMBEDDING

CROSS-REFERENCE TO RELATED PROVISIONAL PATENT APPLICATIONS

This application is a continuation of the provisional patent application 60/244,103 titled "Method and Apparatus for Exploitation of Embedded Invariance in Distributed Communication Networks", filed on Oct. 28, 2000 by the same inventor.

STATEMENT REGARDING FEDERALLY SPONSORED RESEARCH OR DEVELOPMENT

Not Applicable.

BACKGROUND OF THE INVENTION

Wireless communications take place in an increasingly noisy environment. Multiple sources and receivers compete to transmit and receive intelligible signals, competing in an electromagnetic tragedy of the commons as each signal becomes noise for every other signal. Various means have been devised to overcome this problem; these can be found in a variety of sources, including patents and technological journals. Some are herewith summarily described as the background of the current invention.

Most wireless electromagnetic communication networks (WECNs) have a core hierarchy of Base Stations (BS). A newer BS has a multiplicity of sector antennae spatially separated in a known configuration, and communicates with a penumbral scatter of individual subscriber units (SU). If each BS communicates over a different frequency, then each SU must either have a tuned receiver for each station to which the subscriber tunes or, more commonly, a tunable receiver capable of reaching the range of frequencies encompassing those BSs to which it subscribes.

The inherently multipoint nature of WECNs, i.e., their multiple origination and destination nodes, has spawned a growing demand for methods and apparatus that will enable each particular WECN to exploit its particular partition of the spectrum and geography in constantly-changing and unpredictable economic and financial environments. Efficient use of a particular constraint set of frequencies, power, and hardware, is more in demand than ever, as the competitive field and available spectrum grows more and more crowded.

The prior art includes many schemes for maximizing signal clarity and minimizing interference between nodes in a complex, multipoint environment. These include differentiation by: (a) Frequency channels; (b) time slots; (c) code spreading; and (d) spatial separation.

First generation systems (e.g. AMPS, NORDIC) developed for cellular mobile radio systems (CMRS) provide frequency-division multiple access (FDMA) communication between a BS and multiple SUs, by allowing each SU to communicate with the BS on only one of several non-overlapping frequency channels covering the spectrum available to the system. This approach allows each SU to 'tune out' those frequencies that are not assigned, or not authorized, to send to it. Intercell interference is mitigated by further restricting frequency channels available to adjacent BS's in the network, to ensure that BS's and SU's reusing the same frequency channel are geographically removed from each other beyond interference.

Under FDMA, the total number of channels available at each BS is therefore a function of channel bandwidth employed by the system and/or economically usable at the SU. Hardware and regulatory limits on total spectrum available for such channels, and interference mitigation needs of a cellular WECN (cellular reuse factor), effectively constrain the divisibility of the spectrum and thus the geographical interacting complexity of current networks. (i.e. if the hardware requires a 200 kHz differentiation, and the WECN has 5 MHz of spectrum available, then at most 25 separate channels are available to the WECN.) Channelization for most 1G cellular WECNs is 25–30 kHz (30 kHz in US, 25 kHz most other places; for 2G cellular is 30 kHz (FDMA-TDMA) for IS-136, 200 kHz for (FDMA-TDMA) GSM, 1.25 MHz for (FDMA-CDMA) IS-95; 2.5G maintains GSM time-frequency layout; and proposed and now-instantiated channelization for 3G cellular WECNs is FDMA-TDMA-CDMA with 5 MHz, 10 MHz, and 20 MHz frequency channels.

Most so-called second generation CMRS and Personal Communication Services (PCS) (e.g. GSM and IS-136), and '2.5 generation' mobility systems (e.g., EDGE), further divide each frequency channel into time slots allocated over time frames, to provide Time Division Multiple Access (TDMA) between a BS and SUs. (For example, if the hardware requires at least 1 ms of signal and the polling cycle is 10 ms, only 10 separate channels are available; the first from 0 to 1 ms, the second from 1 to 2 ms, and so on.) The combination of TDMA with FDMA nominally multiplies the number of channels available at a given BS for a given increase in hardware complexity. This increase hardware need comes from the fact that such an approach will require the WECN to employ a more complex modulation format, one that can support individual and combined FDMA-TDMA, e.g., FM (for FDMA AMPS) versus slotted root-Nyquist $\pi/4$-DQPSK (for IS-136 and EDGE) or GMSK (for GSM). This substantially increases hardware complexity, and thus cost, for each node of the WECN.

Some second generation mobility systems (e.g. IS95), and most third generation mobility systems, provide code division multiple access (CDMA) between a BS and multiple SUs (for example, IS-136 provides FDMA at 1.25 MHz), using different, fixed spreading codes for each link. The additional "degrees of freedom" (redundant time or frequency transmission) used by this or other spread spectrum modulation can (among other advantages) mitigate or even exploit channel distortion due to propagation between nodes over multiple paths, e.g., a direct and reflection path (FIG. 4), by allowing the communicator to operate in the presence of multipath frequency "nulls" or outages that may be significantly larger then the bandwidth of the pre-spread baseband signal (but less than the bandwidth of the spread signal)

Different spreading code techniques include direct-sequence spread spectrum (DSSS) and frequency hop multiple access (FMHA); for each implemented in a WECN, the hardware at each end of a link has to be able to manage the frequency and/or time modulation to encode and decode the signal correctly. Spreading codes can also be made adaptive, based on user, interference, and channel conditions. But each increase in the complexity of spread spectrum modulation and spreading code techniques useable by a WECN increases the complexity of the constituent parts thereof, for either every BS and SU can handle every technique implemented in the WECN, or the risk arises that a BS will not be able to communicate to a particular SU should they lack common coding.

Finally, individual communication nodes of a WECN may employ further spatial means to improve communications capability, e.g. to allow BS's to link with larger numbers of SU's. Spatial means include using at particular nodes multiple antennae with azimuthally separated mainlobe gain responses to communicate with SU's over multiple spatial sectors covering the a service area. These antennae can provide space division multiple access (SDMA) between multiple SU's communicating with the BS over the same frequency channel, time slot, or spreading code, or to provide reuse enhancement by decreasing range between BS's allowed to use the same time slot or frequency channel (thereby reducing reuse factor required by the communication system). A BS may communicate with an intended SU using a fixed antenna aimed at a well-defined, fixed-angle sectors (e.g. Sector 1 being between 0 and 60 degrees, Sector 2 between 60 and 120 degrees, and so forth), or using an adaptive or "smart" antenna that combines multiple antennae feeds to optimize spatial response on each frequency channel and time slot. The latter approach can further limit or reduce interference received at BS or SU nodes, by directing selective 'nulls' in the direction of SU's during BS operations. (FIG. 5). This is straightforward at the BS receiver, more difficult at the BS transmitter, unless if the system is time-division duplex (TDD) or otherwise single-frequency (e.g., simplex, as commonly employed in private mobile radio systems), or if the SU is based at "large" platforms such as planes, trains, or automobiles, or are used in other applications. This approach can provide additional benefits, by mitigating or even exploiting channel distortion due to propagation between nodes over multiple paths, e.g., a direct and reflection path. A further refinement that has been at least considered possible to adaptive SDMA signal management is the use of signal polarization, which can double degrees of freedom available to mitigate interference or multipath at BS or SU receivers, or to increase capacity available at individual links or nodes in the network. However, current implementations generally require antennae and transmissions with size or co-location requirements that are infeasible (measurable in meters) for high-mobility network units.

Various combinations of TDMA, CDMA, FDMA, and SDMA approaches have been envisioned or implemented for many other applications and services using a WECN, including private mobile radio (PMR) services; location/monitoring services (LMS) and Telematics services; fixed wireless access (FWA) services; wireless local, municipal, and wide area networks (LAN's, MAN's, and WAN's), and wireless backhaul networks.

The proliferation of protocols, the availability and feasibility of bandwidths, and the auctioning of licenses can only act as palliatives to this underlying apparent conflict of interests amongst different WECNs; none of these can by themselves solve the fundamental problem inherent in a shared, common, wireless communications environment.

SUMMARY OF THE INVENTION

Noise can be differentiated from signal by a single, unique quality: noise lacks the precise pattern that is the signal. The invention described here provides integrated means for a WECN to embed into its communications signals unique structure during transmit operations, and to exploit this structure during subsequent receive operations, in order to (1) detect and differentiate those signals in the presence of strong co-channel interference, including similar communication signals with different embedded structure, (2) adaptively and rapidly adjust linear diversity combiners to remove said interference from those signals with the proper embedded structure, allowing acquisition of detected signals at signal-to-interference-and-noise ratios (SINR) that approach the maximum SINR achievable by the combiner, (3) perform this detection and max-SINR processing in the absence of fine timing or carrier synchronization between the transmit and receive processors in the link, minimizing computational and hardware complexity and signaling overhead requirements associated with detection and acquisition functions; (4) calculate link metrics that can aid power control, fine timing, and fine carrier synchronization during subsequent or ancillary system operations, and (5) provide diversity distribution weights for subsequent adaptive transmission operations.

The invention accomplishes these goals at the upper physical layer (U-PHY) of wireless communication links, by performing operations that embed known structure into the transmit signal prior to lower-PHY operations, and using that known structure to: (1) detect and distinguish intentional signals belonging to that WECN from environmental noise, including intentional signals from other, possibly competing WECNs; and, (2) to adjust diversity combining weights to receive such 'structurally authenticated' signals at the maximum signal-to-interference-and-noise ratio (SINR) achievable by a particular set of hardware processing and environmental context constraints existing for each node within that WECN; and, (3) reject unintentional/unauthorized communication signals. The embedded known structure in the transmitted signals guides reception of intentional signals from environmental noise (which includes other communication signals lacking this specific structure), by identifying and intentionally intensifying signals received containing that expected embedded structure. This is analogous to enabling a listener to distinguish, over intervening noise, or over a greater distance, a song with a structure known to the listener from random sounds or other intervening human vocalizations.

This invention actively and aggressively integrates and addresses SINR (signal-to-interference-and-noise ratio) as a solution rather than a problem, and can effectively and efficiently provide improved communications security, accuracy, and efficiency for any WECN.

Two additional enhancements are enabled; in the first, the selection of structure embedded and differentiating the WECN's signals from the non-WECN noise is itself used as a signal to reduce control and status overhead for the WECN; and in the second, when multiple transceiving antennae are involved, reach and discernability for the WECN are enhanced by actively exploiting embedded effects on overlapping, received, structured signals sent by the transmitting antennae. The first capability makes the invention particularly applicable to transmission and reception of short bursts such as control and management frames in wireless LAN's, WAN's and MAN's, which must of necessity be short in duration, so as to avoid congesting the communications medium, and must be received with high fidelity to avoid degrading the communications medium. This capability is also of importance in military and covert communication systems, in which network traffic must be minimized to prevent detection and destruction of communication assets.

In one additional enhancement, the WECN implements a pseudorandom algorithm, which can be keyed to Global Positioning Satellite Universal Time Code (GPS UTC), with further enhancements added at need according to security vs. speed processing tradeoffs, to control the embedding and removal operations. This avoids a need for overt signaling over a WECN exposed to external, hostile, receivers of the key (or changes thereto) needed to distinguish WECN-authenticated signals, thereby exposing said key or changes thereto to unintended listeners. Such an implementation is readily and securely implementable by either a U-PHY physical controller or WECN software or any combination thereof, allowing for differentiable adaptivity, security, and network-level control independent of nodal knowledge.

BRIEF DESCRIPTION OF THE DRAWINGS

FIG. 11 is two alternative, converging, Embedded-signal-differentiation algorithms.

FIG. 12 is a flowchart of an Embedded Invariance approach, from the nodal view.

FIG. 13 is a flowchart of an Embedded Invariance approach, from the link view.

FIG. 18 is an operations and algorithm flow diagram for a Multilink Receiver.

FIG. 19 is link detection and signal separation operations for a WECN network using Embedded structure.

FIG. 20 shows pseudodelay plots and antenna patterns for a WECN network using Embedded structure.

DETAILED DESCRIPTION

The preferred embodiment to the present invention is implemented as an "upper physical layer applique" (U-PHY) for a wide variety of communication systems and modulation formats usable by any WECN. This permits using a number of embedding approaches, transmit/receive signals processing and adaptation algorithms, and combinations of both preceding, to differentiate and make separable thereby WECNs which otherwise share geographic and bandwidth constraints that would result in interference and indistinguishable signals and noise.

Figure 1:
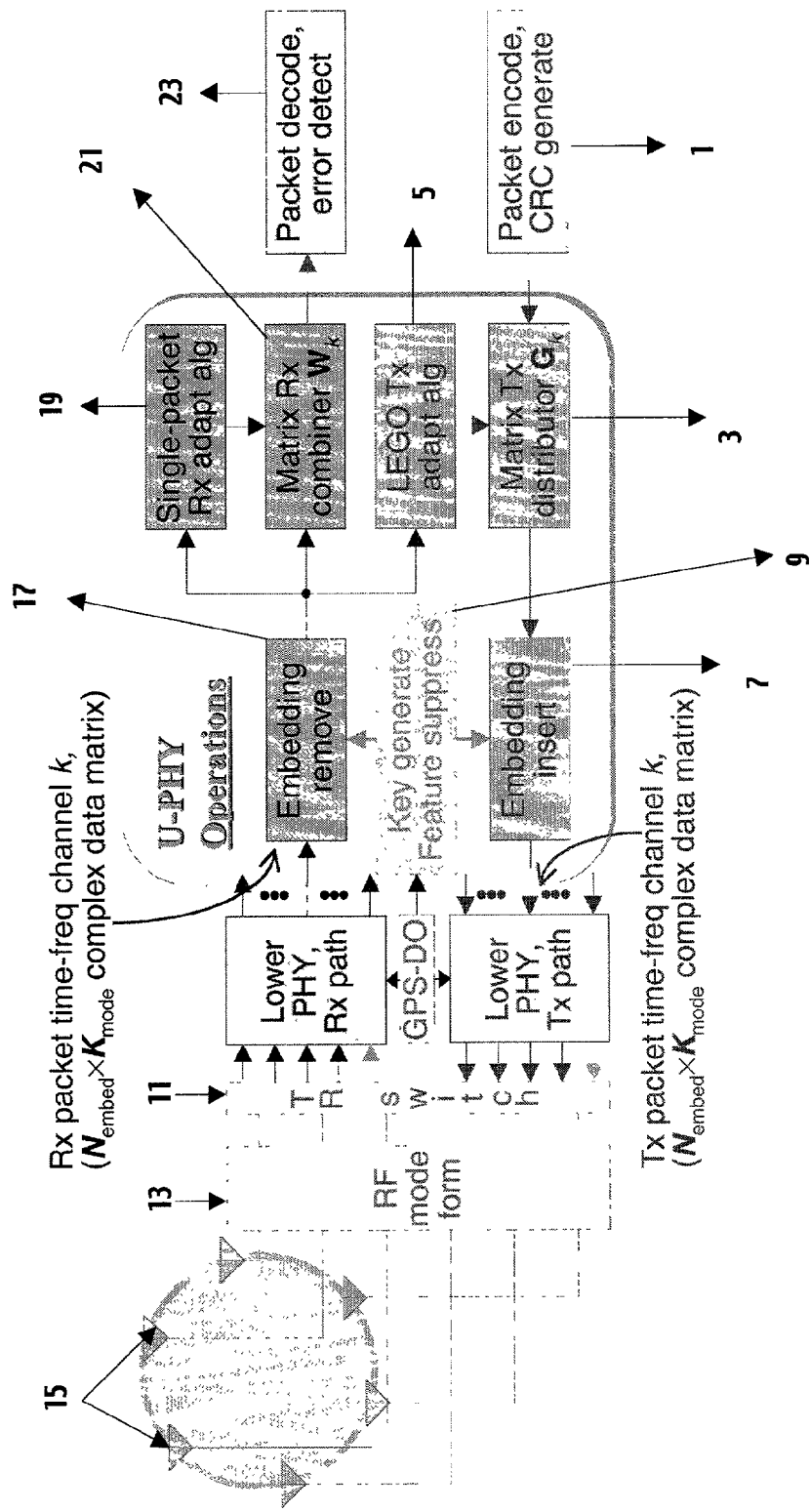
FIG. 1 is the U-PHY diagram for WECN Structural Embedding and Removal

FIG. 1 displays structural embedding (and its converse operation, structural detection and removal). A digital signal packet to be transmitted, which may already be coded (1), is processed by a matrix transmission distributor (3), which includes as part of its weighting the feedback provided by a Locally-Enabled, Global Optimization transmission adaptation algorithm processor (5). The packet then is combined with a structural embedding (7) which is derived in the preferred embodiment from a key-generated processor (9). The now-modified signal, comprising a matrix of $N_{embed} \times K_{node}$ sub-portions, then passes through the transceiver switch (11) and the RF mode-forming element (13), and as an analog set of RF waves is sent out over the antennae array of the node (15).

Detection and de-embedding, the converse operation, start with reception of RF waves which are possible signals at the antennae array (15). These are passed to the RF mode forming element (13) and the transceiver switch (11), and the now-digital signals are examined to ascertain if they contain the embedded signal, which is then removed (17); the remaining data passes through separate sub-processing to provide on the one hand the LEGO feedback (essentially, training the transceiver node to the current environmental context for that link) (5), and on the other, through a single-packet reception adaptation algorithm (19) and matrix combination weighting processor (21), to a final packet form for decoding and error detection (23).

This approach supplies a WECN with particularly useful integrated transmit/receive structures, packet detection algorithms, and blind array adaptation algorithms, as in the preferred embodiment the signal embedding is modeled as a projection onto a known linear subspace at the transmitter output. That enables the WECN to process the data received at the other end of a transmission link with constant false-alarm rate (CFAR) generalized maximum-likelihood (GML) detectors and ML signal estimation algorithms, based only on knowledge of the signal projection employed at the link transmitter, i.e., without knowledge of the content or base (unprotected) modulation format of the signal transmitted to that receiver, and without any knowledge of the spatial distribution of the signal or interference impinging on the receive node.

Figure 2:
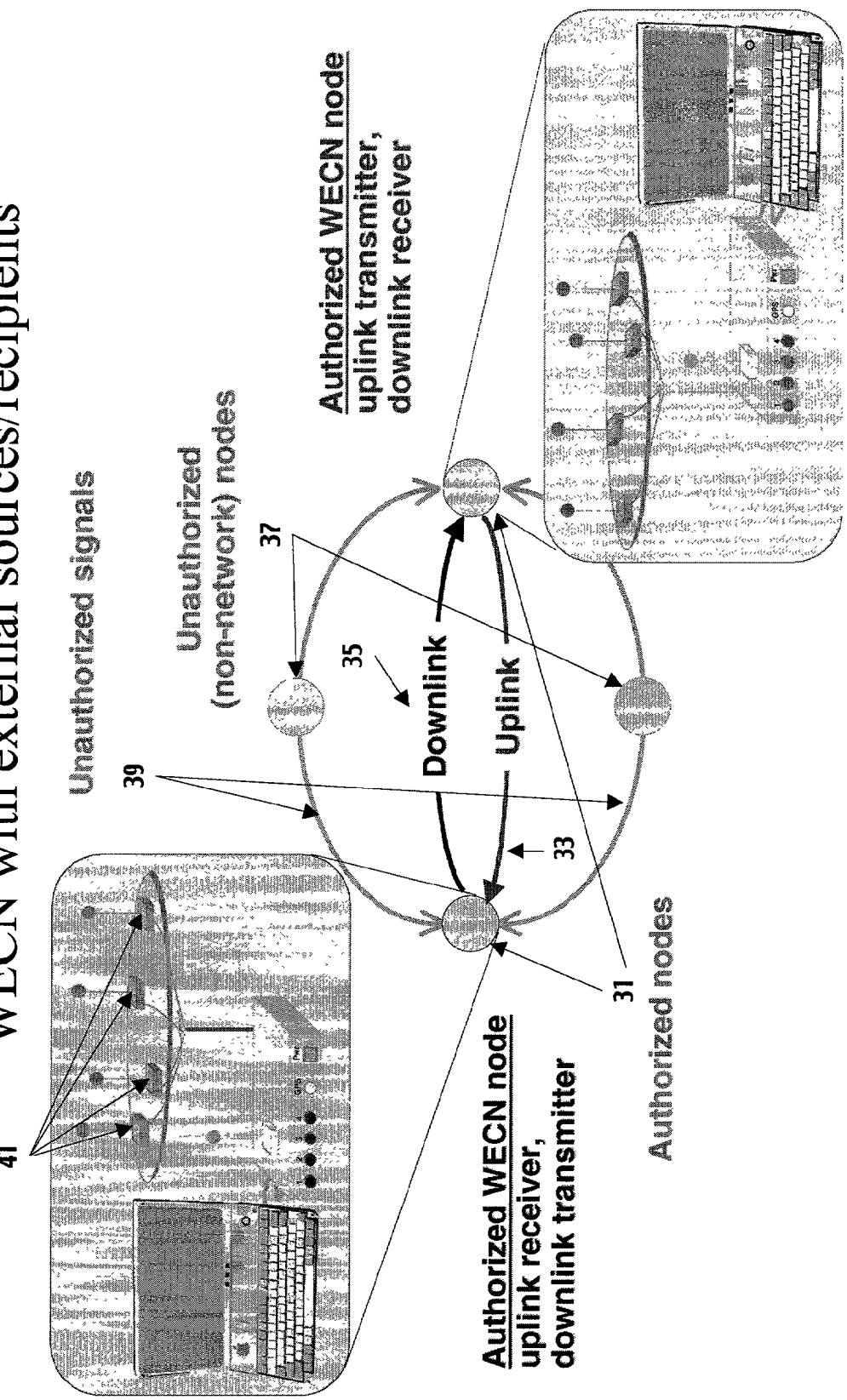
FIG. 2 is a diagram of a WECN with Structural Embedding dealing with external nodes, external transmissions, and external receivers.

Furthermore, in the preferred embodiment the antennae array at the recipient node automatically directs nulls in direction(s) of signals that are not projected over this known subspace, thereby allowing the antennae array to automatically discriminate between users that are authorized to communicate with that receiver, and other users and/or intruders that are not so authorized. In FIG. 2, the two authorized nodes of the WECN (31) form a communications link with an uplink element (33) and downlink element (35). These structurally-authorized transmissions are heeded, while the embedded structure turns these signals into noise to the unauthorized nodes (37). Also, any transmissions (39) from unauthorized nodes (37) are ignored as they lack the embedded structure, and the antennae array of each authorized node (41) can direct nulls (not shown) towards the unauthorized nodes.

In addition, the adaptation algorithm of the preferred embodiment is implemented using QRD-based optimization techniques that achieve the maximum signal-to-interference-and-noise ratio (SINR) attainable by the array over very small time-bandwidth products (TBP), e.g., two-to-four times the number of combiner weights in the array (e.g., using TBP's of 8-to-16 for a four element array), allowing packet detection (and intruder rejection) in well under 1 ms over very narrow frequency channels (e.g., in 320-to-640 μs over a 25 kHz channel, for a four-element antenna array). Lastly, the approach can be combined with link and network level transmit adaptation approaches and feature suppression measures to further improve security and limit exposure of individual nodes or links in the WECN to unauthorized potential recipients.

This embodiment further provides additional features that can benefit other WECN functions, which include the ability to exploit MIMO internode channel or network responses, at the link or network level, and the ability to detect and recover packets prior to fine synchronization between transmit and receive nodes of the WECN, based on the previously network-based structural synchronization to a predetermined or external standard. (A temporal and globally-available one, GPS UTC, in the preferred embodiment). The former feature improves capacity and quality of the WECN. The latter feature enables very fast acquisition with nodes that have drifted out of fine synchronization with the WECN (e.g., sub-millisecond acquisition over 25 kHz communication channels), or can be exploited to eliminate any need for fine sync operations in their entirety.

The preferred embodiment of the present invention can be exploited to mitigate and confuse (either or both) surveillance measures at the node, link, or network level. Additionally, it automatically mitigates jamming measures, by enabling the combination of signals received over multiple spatial, polarization, time or frequency diverse antenna arrays, and the nullification of intentional or inadvertent jamming sources on the basis of their differing diversity from intended WECN signals. Additionally, the preferred embodiment can obtain adaptive combining weights blindly, very rapidly, and over narrow frequency channels. The preferred embodiment also employs directive or retrodirective multielement diversity distribution weights, derived from these receive weights, over subsequent transmission intervals, permitting the source transceivers to direct energy away from jamming emitters, and towards intended receive nodes, thereby providing an additional degree of jam resistance, by allowing reception at increased SINR at the other end of the link.

Additionally, the preferred embodiment allows a WECN in a noisy or potentially compromised environment to resist or confuse man-in-the-middle techniques that transmit corrupted or decorrelated replicas of environment data containing the network signals, by using self-coherence restoral (SCORE) techniques that can reject network signal components with imperfect correlations to the embedded structures, thereby providing at least one means for the WECN to resist spoofing measures.

Figure 3:
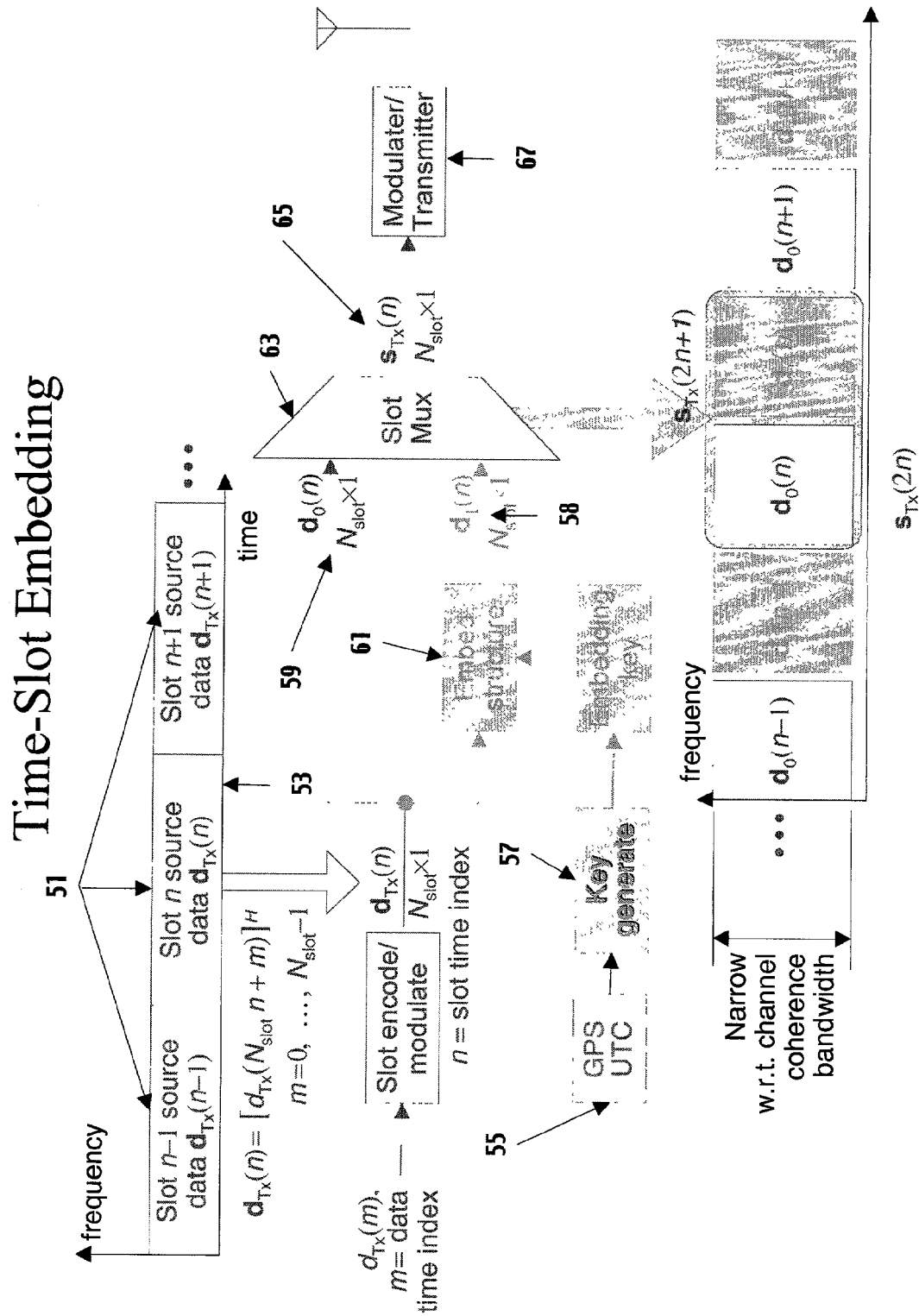
FIG. 3 is of a Time-Slot Embedding approach.

In one embodiment, the transmit structure is embedded using the time-slot approach shown in FIG. 3. This Figure details a method for embedding known structure into an $N_{slot} \times 1$ vector of source data $d_{Tx}(n)=[d_{Tx}(N_{slot}n) \ldots d^{Tx}(N_{slot}n+N_{slot}-1)]^T$ (51) generated during slot n (53) using a general slot encoding and modulation process, by slot multiplexing $d_{Tx}(n)$ ($d_0(n)$, (59) in FIG. 3) with a replica of $d_{Tx}(n)$ ($d_1(n)$ (58) in FIG. 3) that is subjected to a reversible structural embedding process known to the intended receiver of $d_{Tx}(n)$. In FIG. 3, this embedding process (61) is controlled by an embedding key, e.g., based on Time of Day (TOD) in GPS Universal Time Coordinates (UTC) (55), that is known at both ends of the communication link but generated at the transmitter (57). The slot multiplexer (63) sequentially orders $d_0(n)$ and $d_1(n)$ in time, to create a stream of $N_{slot} \times 1$ transmitted data vectors $S_{Tx}(n)$ comprising $S_{Tx}(2n)=d_0(n)$, $S_{Tx}(2n+1)=d_1(n)$ (65), which is passed onto subsequent modulation operations necessary to generate the RF transmitted signal waveform (67).

Figure 4:
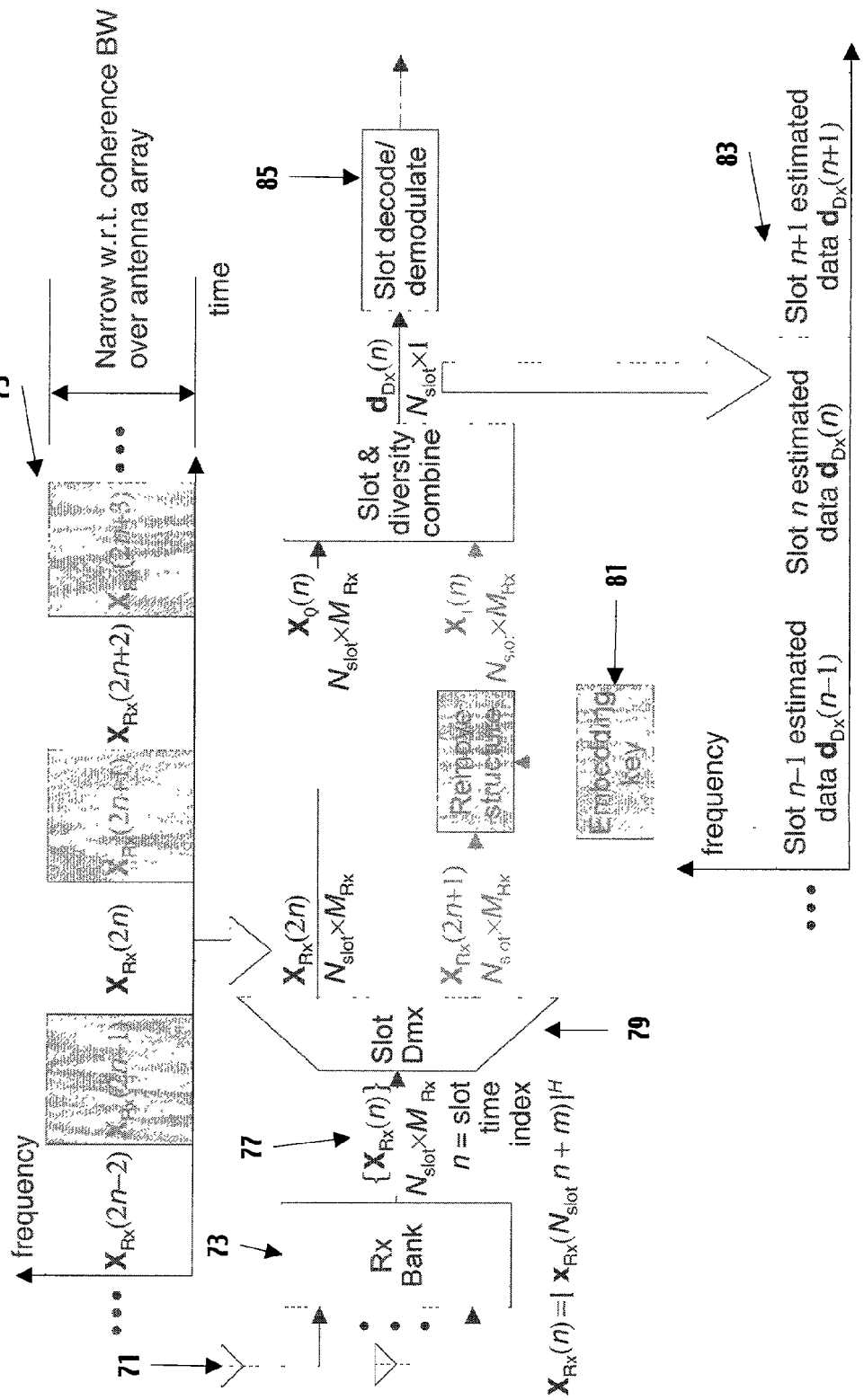
FIG. 4 is of a Time-Slot Embedded structure differentiation and de-embedding.

FIG. 4 details the converse operation for recovering and removing embedding at the intended transmitter in the link.

The intended signal is received by a $M_{Rx}$-element antenna array (71) (more generally, by a diversity receiver collecting data over $M_{Rx}$ linearly-independent transmission paths, e.g., spatially separated antennas, independent polarizations, or separate time slots and frequency channels), in the presence of noise, interference, and propagation effects such as observed time offset (delay), carrier offset, and time/frequency selective channel distortion. Each of these diversity channels is coarsely synchronized to the transmission time and carrier frequencies employed at the transmitter, frequency converted to complex baseband representation, and sampled over the time intervals used to transmit each data slot at the transmitter in the link.

In one embodiment, the coarse time and frequency synchronization can be based on external references, e.g., GPS UTC and carrier references provided by GPS disciplined oscillators (GPS-DO's; not shown in FIG. 4) at both ends of the link, in which case the received signal will possess a time and carrier offset proportional to the range and velocity difference between each communication node.

In other embodiments, this synchronization is based on prior synchronization between the communication nodes, which may have significantly changed between subsequent communication events. However, fine synchronization that compensates for observed timing and carrier offset between the nodes, e.g., due to range and velocity differences between the nodes, is not necessary prior to or during signal detection and max-SINR extraction operations in any embodiment of the invention. In particular, any fine synchronization operations necessary to complete demodulation and decoding of the transmitted source data can be performed after the signal has been detected and extracted from the noise and interference encountered by the receiver, greatly aiding the synchronization process, and obviating such synchronization for some applications and modulation format.

Figure 5:
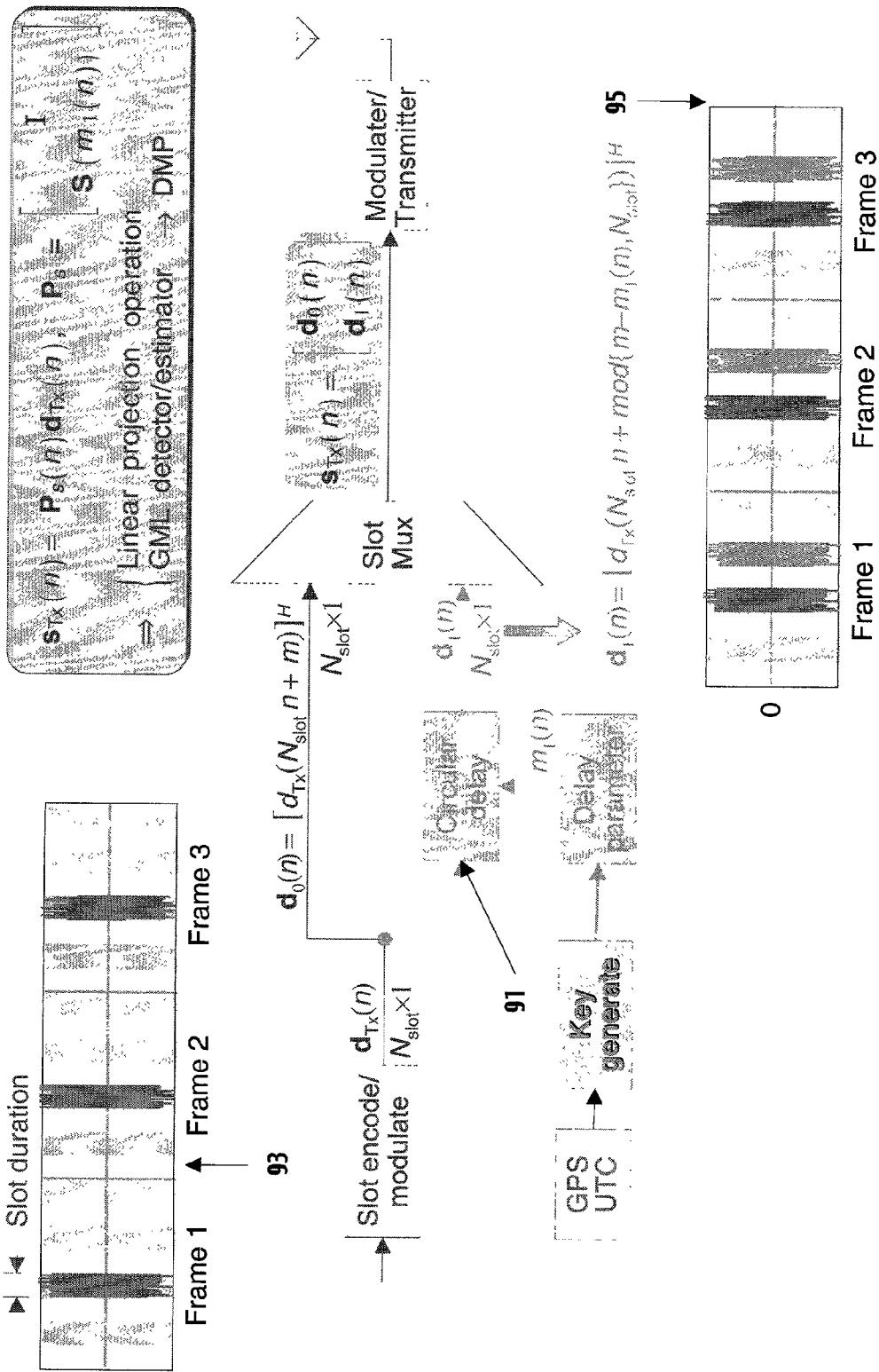
FIG. 5 is of a Delay-Invariant Embedding approach.
Figure 6:
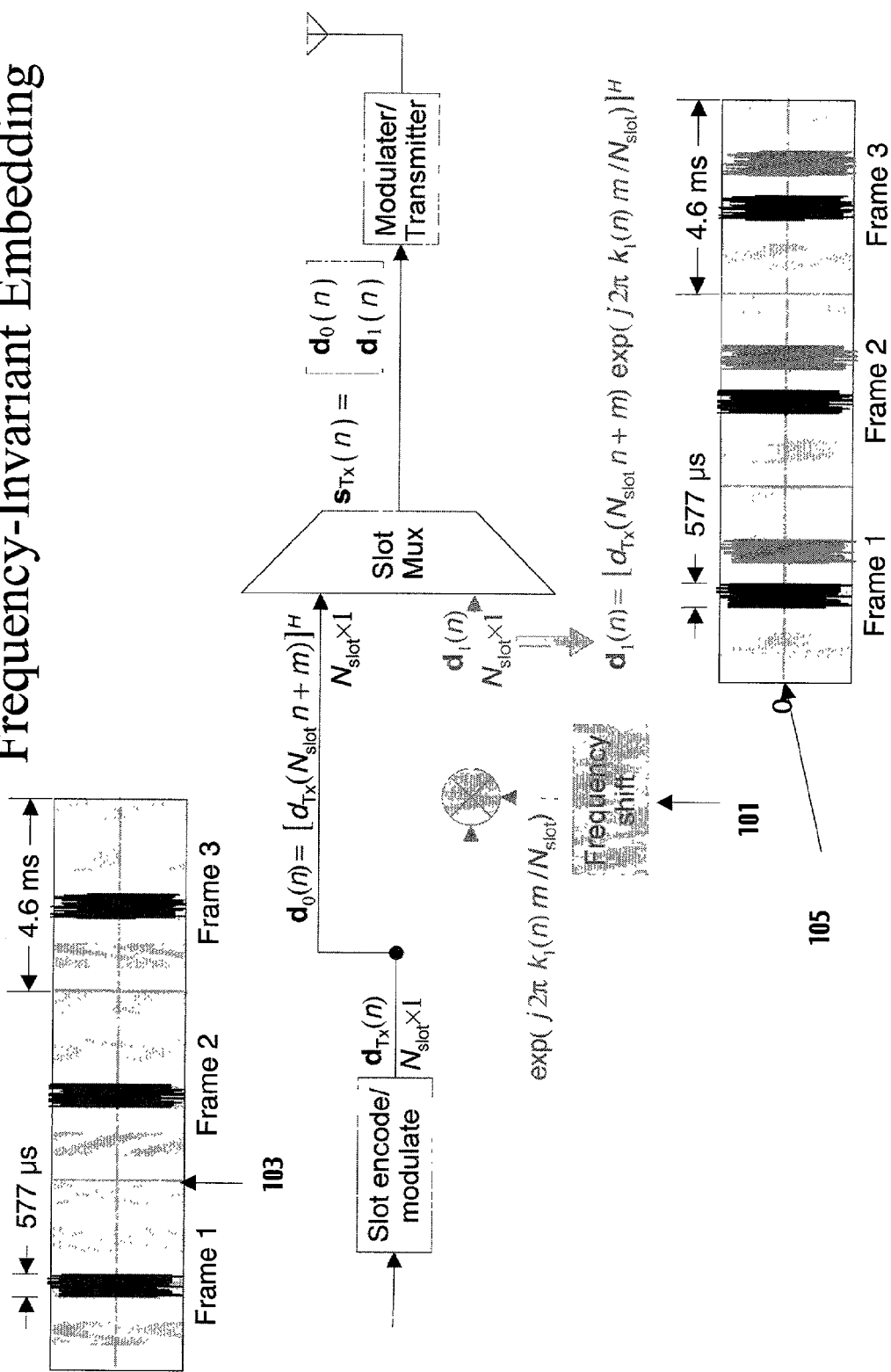
FIG. 6 is of a Frequency-Invariant Embedding approach.

After the data is sampled, each received data vector $X_{Rx}(n)$ (77) is passed through a slot demultiplexer and structure removal processor (79) to obtain unembedded and embedded received data vectors $X_{Rx}(2n)$ ($X_0(n)$) and $X_{Rx}(2n+1)$. The embedded data vector $X_{Rx}(2n+1)$ is then passed through a structure removal process to generate de-embedded receive data vector $X_1(n)$. If the delay or frequency invariant embeddings shown in FIGS. 5 and 6 are employed at the transmitter, the coarse synchronization is sufficiently accurate to allow EQ. 5–9, infra, to hold, and the embedding keys $m_1(n)$ or $f_1(n)$ are known at the receiver, then the $X_0(n)$ and $X_1(n)$ will contain identical replicas of the source data $d_{Tx}(n)$ generated at the transmitter, modulated by the observed delay (more generally, channel distortion) and/or carrier offset (more generally, time variation) of the transmission channel. That is, the source data will be nearly perfectly correlated between the two received data sets $X_0(n)$ and $X_1(n)$. In contrast, noise, unintended interference signals, and intended (interfering) signals employing other embedding keys will induce little or no correlation between $X_0(n)$ and $X_1(n)$. This circumstance provides an ideal environment for implementation of rapidly converging linear combiner adaptation and signal detection algorithms based on maximum-likelihood (ML) estimation and generalized ML (GML) detection schemes.

The transceiving hardware (73) first changes the analogue RF signals into $M_{Rx} \times 1$ digital vectors $x_{Rx}(n)=[x_{Rx}(n;1) \: x_{Rx}(n;2) \ldots x_{Rx}(n;M_{Rx})]^T$, where $x_{Rx}(n;m)$ denotes the received signal sampled over time sample n and antenna element m (75). For time-slot embedding, these received signal vectors are then interpreted by the receiving unit as a series of slots $N_{slot}$ elements long, i.e., as $N_{slot} \times M_{Rx}$, matrices $X_{Rx}(n) = [x_{Rx}(N_{slot}n) \; x_{Rx}(N_{slot}n+1) \ldots x_{Rx}(N_{slot}(n+1)-1)]^H$. $X_{Rx}(n)$ (77) is then passed through a slot demultiplexer (79) to form unembedded and embedded data matrices $X_{Rx}(2n)$ ($X_0(n)$) and $X_{Rx}(2n+1)$. The embedded data vector $X_{Rx}(2n+1)$ is then passed through a structure removal process to generate de-embedded receive data vector $X_1(n)$, using the known embedding key (81). The $N_{slot} \times M_{Rx}$ unembedded and de-embedded received slot vectors $X_0(n)$ and $X_1(n)$ are then combined together over their $M_{Rx}$ diversity dimensions to generate an $N_{slot} \times 1$ estimated source vector $d_{Rx}(n)$ (83), which is then passed to decoding and demodulation operations (85).

FIG. 5 shows a second embedding technique, delay-invariant embedding, where $d_{Tx}(n)$ is subjected to a circular delay operation (91) before being multiplexed with the non-delayed data element. (The delay in the preferred embodiment again being generated by the GPS-UTC driven key generator.) In this approach, Embedded slot data $d_1(n)$ is given by $$d_1(n) = [d_{Tx}(N_{slot}n + \text{mod}\{m - m_1(n), N_{slot}\})]^T \quad \text{EQ. 1}$$
$$= [d_0(N_{slot}n + \text{mod}\{m - m_1(n), N_{slot}\})]^T$$
$$= S_{delay}(m_1(n); N_{slot}) d_0(n)$$

where $\text{mod}(\cdot, N)$ denotes the modulo-N operation and circular delay sequence;

$\{m_1(n)\}$ is known at both ends of the link;

and where $S_{delay}(m; N_{slot})$ is an $N_{slot} \times N_{slot}$ sparse invertible matrix that circularly shifts $d_0(n)$ by delay m. This creates from the 'single pulse' structure of the original signal (93) a unique 'multiple pulse' structure (95). A process for dembedding which is readily discernible by those skilled in the art from FIGS. 4 and 5 is used to de-embed the signal at the intended receiver.

FIG. 6 shows a third embedding technique, frequency-invariant embedding, where $d_{Tx}(n)$ is given a digital carrier shift operation (101) to generate $d_1(n)$. Embedded slot data $d_1(n)$ is given by $$d_1(n) = [d_{Tx}(N_{slot}n + m)\exp(j2\pi m f_1(n))]^T \quad \text{EQ. 2}$$
$$= [d_0(N_{slot}n + m)\exp(j2\pi m f_1(n))]^T$$
$$= S_{freq}(f_1(n)) d_0(n)$$

where frequency shift sequence $\{k_1(n)\}$ is known at both ends of the link;

and where $S_{freq}(f)$ is an $N_{slot} \times N_{slot}$ diagonal invertible matrix that frequency shifts $d_0(n)$ by carrier offset f Again, the single-frequency signal vector (103) becomes a multiple-frequency vector with structured offset (105), making the embedding readily differentiable and removable when the embedding key is known. A process for dembedding which is readily discernible by those skilled in the art from FIGS. 4 and 5 is used to de-embed the signal at the intended receiver.

In particular, for both circular delay-shifted and frequency-shifted embedding, transmitted signal $s_{Tx}(n)$ can be expressed as $$s_{Tx}(n) = P_{embed}(n) d_{Tx}(n) \quad \text{EQ. 3}$$

where $P_{embed}(n) = [I \; S^T_{embed}(n)]^T$, is a $2N_{slot} \times N_{slot}$ linear projection matrix known at each end of the link. This makes implementation of the particular de-embedding process at the intended receiver even more readily discernible to those skilled in the art. Many other embedding procedures (and de-embedding) procedures are also encompassed by EQ. 3, all of which admit rapidly-converging signal detection and acquisition algorithms based on ML signal estimation and GML signal detection procedures, and all of which specifically admit auto-SCORE weight adaptation procedures.

The embedding process described in EQ. 1 and shown in FIG. 4 is delay invariant if $d_0(n)$ is generated using OFDM modulation operations, $$d_{Tx}(n) = OFDM\{[D_{Tx}(n)]\},$$
$$D_{Tx}(n) = [D_{Tx}(0,n) \ldots D_{Tx}(N_{FFT}-1,n)]^T = [D_{Tx}(k,n)] \quad \text{EQ. 4}$$
$$\Rightarrow D_1(k,n) = D_0(k,n)\exp(-j2\pi k \, m_1(n)/N_{FFT})$$
$$\Leftrightarrow D_1(n) = S^*_{freq}(m_1(n)/N_{FFT}) D_0(n);$$

where $N_{FFT}$ is the FFT size employed in the OFDM modem, if the maximum observed channel delay is less than the OFDM cyclic prefix duration $T_{cyc} = (N_{slot} - N_{FFT}) T_{sample}$, $$s_{Tx}(n) \leftarrow s_{Tx}(n-m), \; \leq N_{slot} - N_{FFT}$$
$$\Rightarrow D_1(n) = S^*_{freq}(m_1(n)/N_{FFT}) D_0(n), \quad \text{EQ. 5}$$

where $T_{sample}$ is the sampling period of the OFDM modem. More generally, embedding EQ. 1 is invariant to arbitrary time invariant channel distortion with maximum observed group delay less than $T_{cyc}$, $$s_{Tx}(n) \leftarrow h(n) * s_{Tx}(n), \; |h(n)| = 0, \; n \leq 0, \; n > N_{slot} - N_{FFT}$$
$$\Rightarrow D_1(n) = S^*_{freq}(m_1(n)/N_{FFT}) D_0(n), \quad \text{EQ. 6}$$

where "*" denotes the linear convolution operation.

Delay invariance can be obtained for non-OFDM waveforms by adding a guard interval with duration $T_{guard}$ greater than the maximum observed group delay of the channel at the end of each slot. Similarly, the embedding process described in EQ. 2 is frequency-shift invariant or frequency invariant to carrier offset within the channel bandwidth of the signal modem, $$s_{Tx}(n) \leftarrow e^{j2\pi f n} s_{Tx}(n)$$
$$\Rightarrow d_1(n) = S_{freq}(f_1(n)) d_0(n) \quad \text{EQ. 7}$$

More generally, embedding EQ. 2 is invariant to arbitrary memoryless channel modulation $d_0(n) \leftarrow c(n) \, d_0(n)$ which does not unduly spread the bandwidth of the transmitted data waveform. Neither embedding is invariant to frequency and time invariance; however, carrier offset induces a simple phase shift between $d_0(n)$ and $d_1(n)$ under embedding EQ. 1, while timing offset induces a simple phase shift between $d_0(n)$ and $d_1(n)$ under embedding EQ. 2, $$s_{Tx}(n) \leftarrow e^{j2\pi f n} s_{Tx}(n), \; d_1(n) = S_{delay}(m_1(n); N_{slot}) d_0(n)$$
$$\Rightarrow d_1(n) = \exp(j\phi_1(n)) S_{delay}(m_1(n); N_{slot}) \, d_0(n) \quad \text{EQ. 8}$$
$$s_{Tx}(n) \leftarrow s_{Tx}(n-m), \; d_1(n) = S_{freq}(f_1(n)) \, d_0(n)$$
$$\Rightarrow d_1(n) = \exp(\phi_1(n)) S_{freq}(n) d_0(n) \quad \text{EQ. 9}$$

where phase offset $\phi_1(n)$ is proportional to $m_1(n)f$ or $f_1(n)m$ in EQ. 8 or EQ. 9, respectively.

In other embodiments of the invention, the embedding can be applied at different levels or stages of the signal processing. The embedding can be applied at lower "levels" in the PHY, e.g., at later stages in the modulation process (including analog processing stages), or at higher levels in the PHY, e.g., to tones or subcarriers during OFDM modulation processes; similarly, the embedding can be applied to baseband symbol sequences in pulse amplitude modulated (PAM) and direct-sequence spread spectrum (DSSS) communication links. Such structural embedding can also be combined with modulation operations, e.g., at substages of DSSS or code-shift-keyed (CSK) spreading operations if the spreading process can be expressed as concatenations or Kronecker products of multiple smaller spreading processes.

Other, alternative embedding approaches and structures can be implemented, including tone-multiplexed embedding, explicit network authentication and control signal embedding, and projective embedding, in which the signal is embedded into an existing structure, which may be externally known, present in the environment, or otherwise prepared. Those implementations are deemed to fall within the full scope of this invention and interpretations of the claims should not exclude the same, except as may be required by the prior art.

Figure 7:
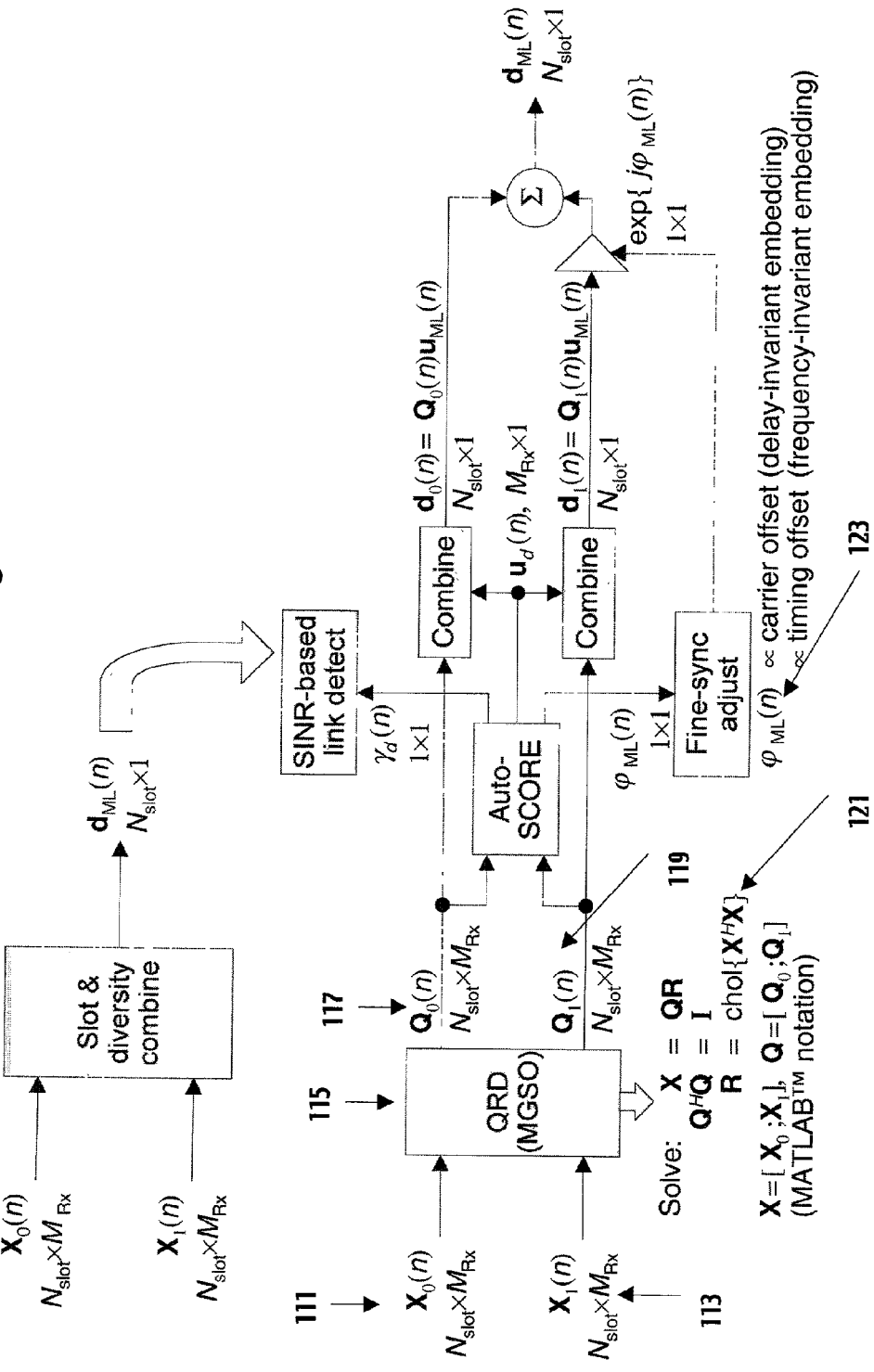
FIG. 7 is an Auto-SCORE Adaptation—data whitening and environmental evaluation.
Figure 8:
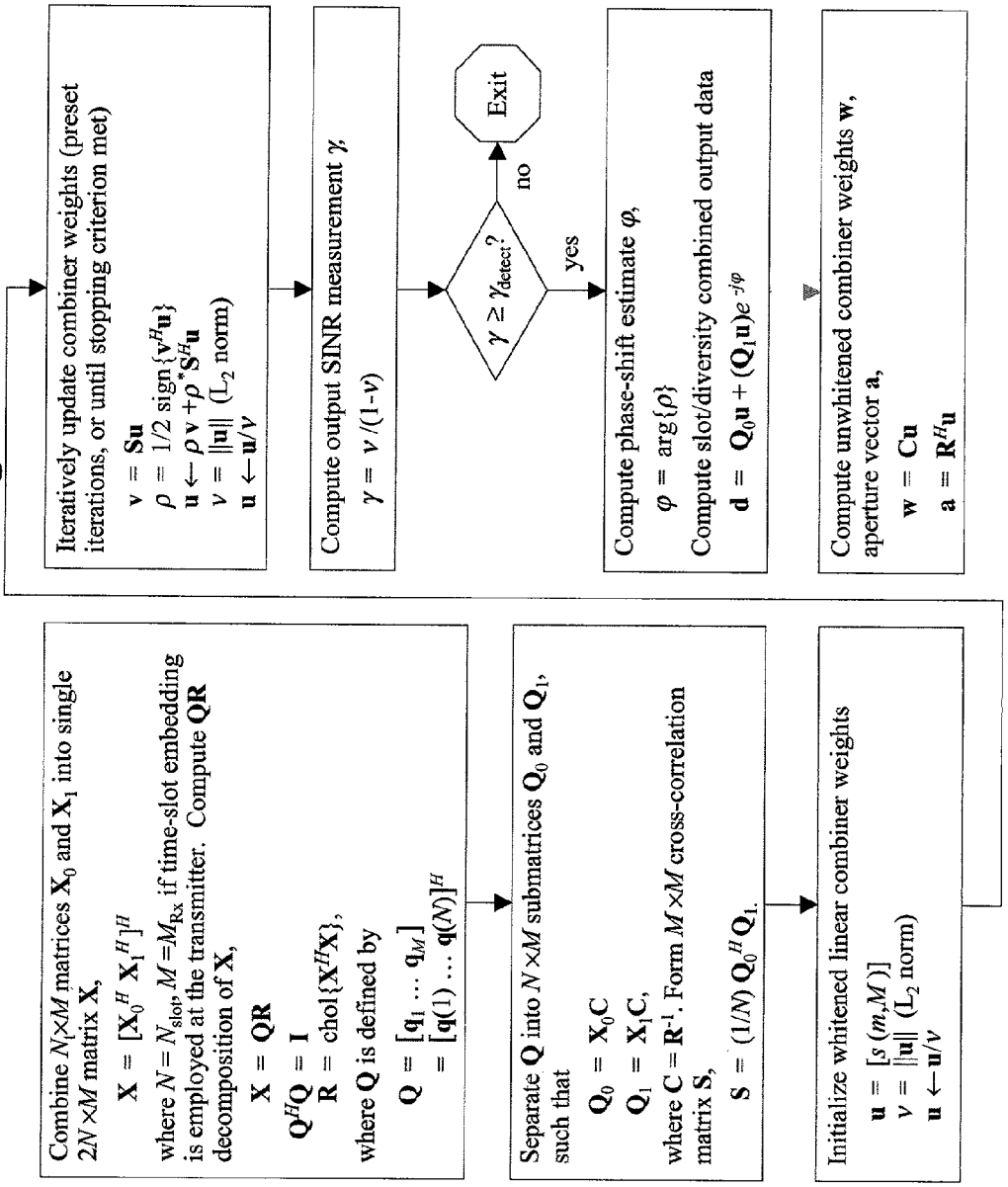
FIG. 8 is a single-link Auto-SCORE Adaptation algorithm.

The preferred embodiment to the present invention uses the auto-SCORE reception adaptation algorithm detailed in FIGS. 7 and 8 to rapidly adjust for delay-invariant, frequency-invariant, combined delay- and frequency-invariance, or other embedding approaches.

FIG. 7 details how the $N_{slot} \times M_{Rx}$ unembedded and de-embedded received data blocks $X_0(n)$ (111) and $X_1(n)$ (113) are first concatenated into a single $2N_{slot} \times M_{Rx}$ data block $X(n)=[X_0^H(n)\ X_1^H(n)]H$, and passed to a spatial whitening block that performs a QR decomposition (115) or equivalent operations (e.g., autocorrelation matrix and direct Cholesky factor calculation) to compute spatially whitened receive data Q and upper-triangular Cholesky factor R (X=QR, $Q^H Q=I$, $R^H R=X^H X$). The whitened data Q is then separated into $Q_0=X_0 C$ (117) and $Q_1=X_1 C$, where $C=R^{-1}$ (119) and cross-correlated to form whitened correlation matrix $S=Q_0^H Q_1$.(121) S is then used to calculate max-SINR estimate γ, whitened $M_{Rx} \times 1$ combiner weights u, and cross-slot phase shift estimate φ, using the algorithm detailed in FIG. 8.

The SINR estimate is used to detect the presence of intended signal energy for the recipient node, and to provide a metric for signal quality estimation and power management algorithms used during subsequent transmission operations, while the whitened combiner weights and phase estimate are used to extract the transmitted signal from the noise and interference. The phase estimate can also be used to aid fine synchronization algorithms, e.g., to aid subsequent data demodulation and decoding operations.

FIG. 8 details the auto-SCORE algorithm employed in the preferred embodiment. The auto-SCORE algorithm computes the dominant mode $\{v_1, u_1, \phi_1\}$ of the modified auto-SCORE eigenequation, $$v_1(\phi)u_1 = S(\phi)u_1, \ v_k(\phi) \geq v_{k+1}(\phi)$$

$$S(\phi) = 1/2(Se^{j\phi} + S^H e^{-j\phi})$$

$$\phi_1 = \arg\max_{100} v_1(\phi) \qquad \text{EQ. 10}$$

The eigenvector and phase estimate is then used to form source data estimate $d_{Rx}(n)$ using the algorithm $$d_{Rx}(n) = Q_0(n)u + (Q_1(n)u)e^{-j\phi} = d_0(n) + d_1(n)e^{-j\phi} \qquad \text{EQ. 11}$$

In the preferred embodiment, the auto-SCORE eigenequation is optimized using the power method recursion shown in FIG. 8. However, this eigenequation can be optimized using a number of methods.

In this approach, used in the preferred embodiment, $\phi_{ML}(n)$ (123) is a measured quantity and expresses the current environmental context in which the communications link is operating; in delay-invariant embedding, it expresses the carrier offset; and in frequency-invariant embedding, it expresses the timing offset. This permits the use of both offsets in an single communications link, greatly increasing the adaptability to environmental constraints in a dynamic fashion. Furthermore, the measured and calculated $\phi_{ML}(n)$ essentially expresses the fine synchronization.

The goal of the Auto-SCORE algorithm is to solve $$v(\phi)u = S(\phi)u \qquad \text{EQ. 12}$$

where $S(\phi)=1/2(Re^{j\phi}+R^H e^{-j\phi})$,
$\|u\|=1 (L_2 \text{ norm})$,
$v(\phi)=$max eigenvalue; and
$\phi=\arg\max_\phi v(\phi)$.

The algorithm initializes values as follows: the initial (v, φ, u) estimate, S[s(m,n)], m, n=1 . . . M] is set such that u=[s(m,M)], v=∥u∥($L_2$ norm), and u←u/v, such that u is initialized to the weight value provided over the previous slot-pair (for continuous links).

The process then iterates, to refine the dominant eigenvalue estimate. In the preferred embodiment there are 2 to 4 iterations; in an alternative embodiment the iteration continues until v achieves a target value, and in a third alternative embodiment, the iteration continues until the change in v, Δv, falls below a target threshold. During each iteration the following steps occur:

$$v = Ru;$$

$$p = 1/2 \text{ sign } \{v^H u\};$$

$$u \leftarrow -pv + p^* R^H u;$$

$\|u\|=1(L_2 \text{ norm})$; and, $$u \leftarrow -/v. \qquad \text{EQ. 13}$$

The process finalizes with converting intermediated values to usable link statistics, with $\phi=\arg\{p\}$ and $\gamma=v/1-v$, where φ is proportional to the non-variant parameter (in delay-invariant embedding, the observed carrier offset; in frequency-invariant embedding, the observed timing offset), and γ is the approximate link SINR and is used as a detection statistic, e.g. in random access radios.

Note that the algorithm shown in FIG. 8 provides an additional degree of quality enhancement, by combining the signal received on the unembedded and embedded (de-embedded) time slots. This combining step can improve the SINR of the extracted signal by an additional 3 dB. Equivalently this processing step can be used to improve the efficiency of the link by as much as 1 bps/Hz. This can offset the efficiency loss incurred by the embedding process, which notionally cuts the data rate of the link by a factor of 2. This capacity improvement can be particularly effective in low-efficiency communication systems, e.g., military and commercial spread spectrum systems, links operating at extreme range, power constrained communication systems, and network management signals employed in commercial communication systems, in which a 3 dB performance improvement can be exploited to double capacity of the link by other means, and/or where system capacity is outweighed by other system considerations, e.g., network vulnerability to hostile threats and countermeasures, need to broadcast data to all users in a network, or need to minimize time required to synchronize short data bursts.

Figure 9:
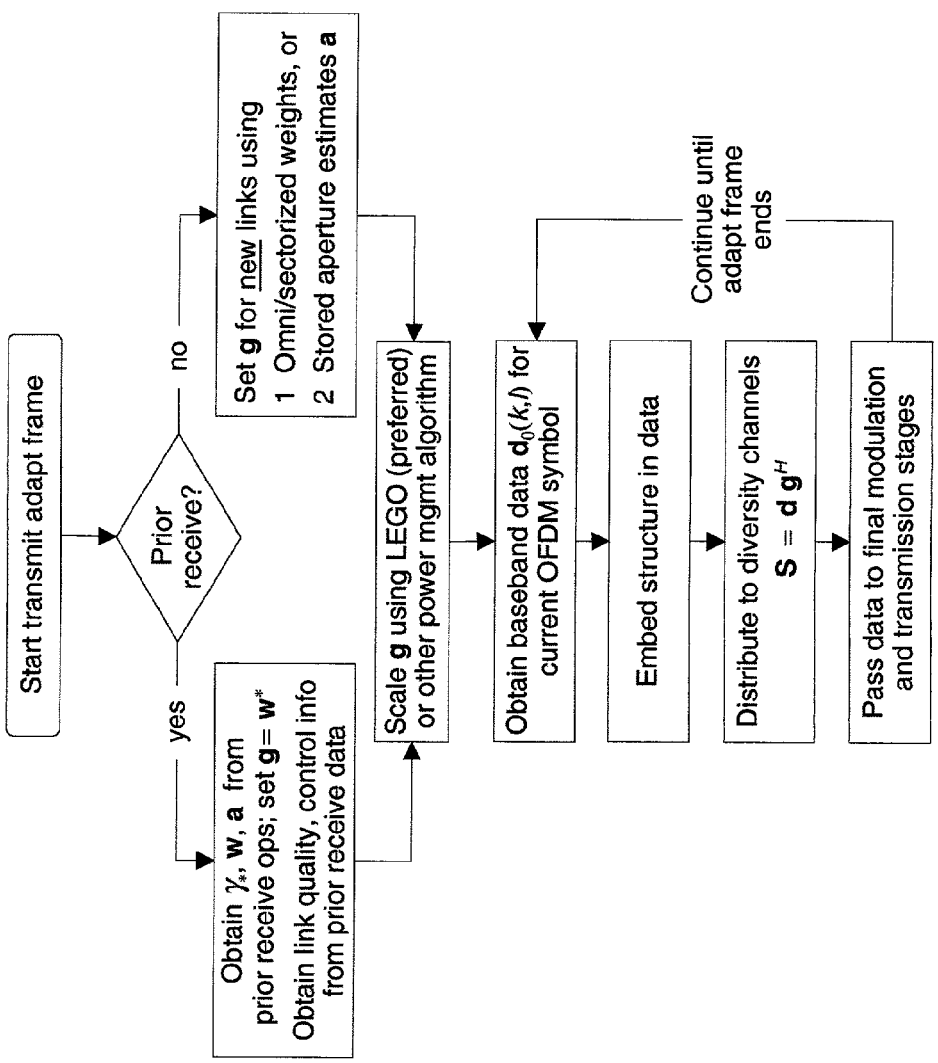
FIG. 9 is a single-link Embedded structure transmitter flow diagram.

FIG. 9 shows the logical flow for the approach used for each transmission frame where embedded structure exists, to adapt the transmitter for local environmental context detected during the adaptation phase, which can either be an initial (no prior receptions in this link) or feedback state.

Figure 10:
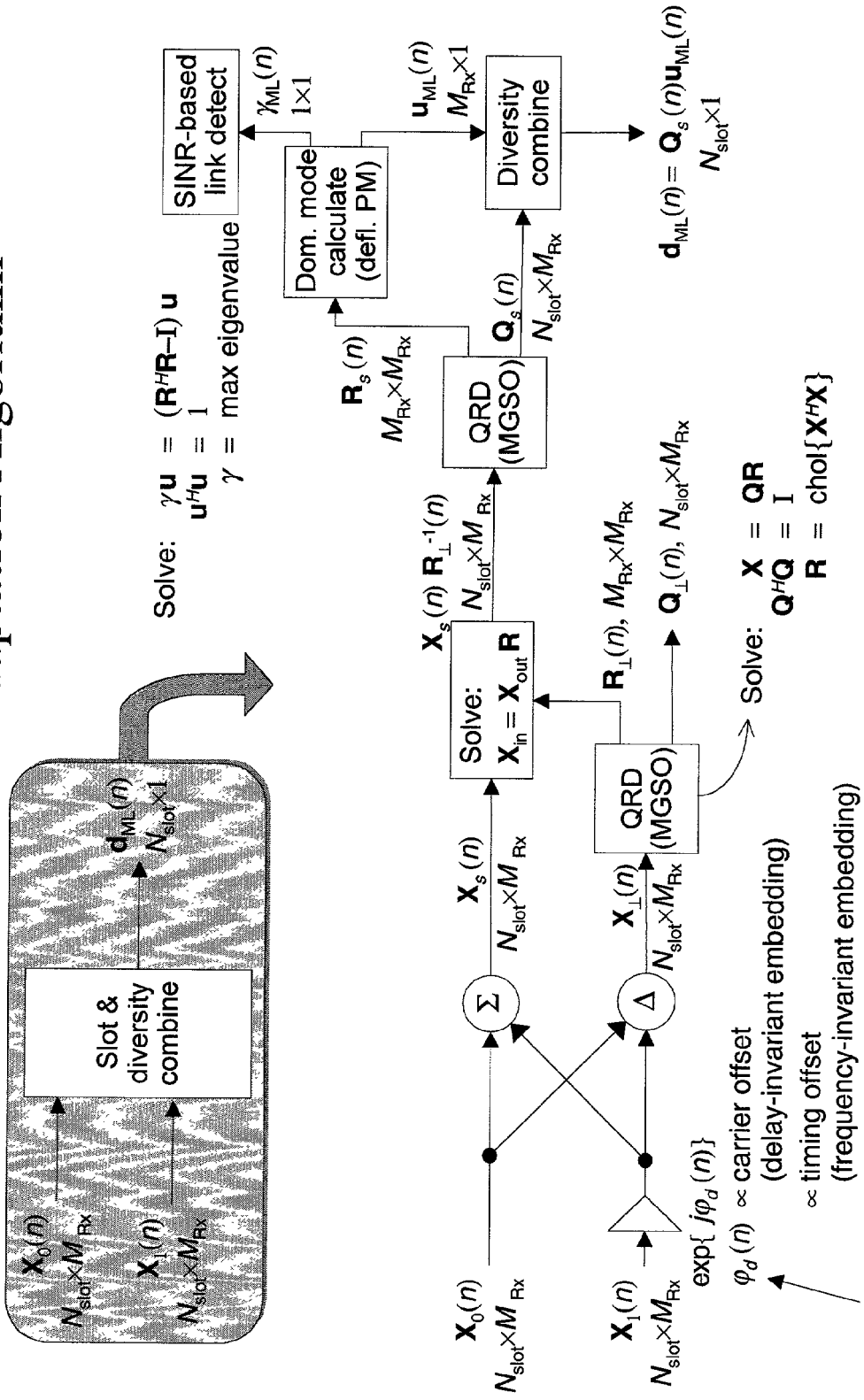
FIG. 10 is an alternative DMP Adaptation algorithm.

FIG. 10 shows an alternative, Dominant Mode Prediction (DMP) adaptation algorithm, implementing a prior art means to the embedding and de-embedding approach of the present invention. This approach is not used by the preferred embodiment for a number of reasons. First, the value $\phi_d$ (n) (131), an offset term, must be applied to both the embedded structure and the data, which increases the processing and computational effort required for each signal. Secondly, $\phi_d$ must either be previously communicated to the intended recipient (creating overhead or lessened security for the WECN), or previously commonly known at both ends of every link (again, creating overhead or lessened security for the WECN), or it must be an externally-derivable value (which may not increase overhead but either increases processing as the derivation is done, or decreases WECN security as any non-WECN node which uses that external value becomes automatically 'authorized' thereby.

FIG. 11 sets side-by-side the previously-described and different differentiation algorithms that enable a WECN to use the embedded structure. Separate embodiments of the invention use one or the other. However, it is feasible for a more complex WECN to shift amongst multiple differentiation algorithms, depending upon the hardware and environmental constraints and the communication goals for particular links or communication sessions along any particular link. For example, the DMP approach can converge more rapidly if (but only if) the estimate $\phi_d$ is correct, while the Auto-SCORE approach is computationally simpler and independent of knowledge of the estimate $\phi_d$. Accordingly, a further embodiment of the invention incorporates the ability to adaptively select from a set of differentiation algorithms that which most closely meets the needs of a particular communication and the hardware and software required to handle both such selection and such use.

FIG. 12 describes the process flow for a WECN using embedded invariance, in particular, as in the preferred embodiment, a time-invariant offset using TDD frames and subframes, from a nodal view. Network adaptations (151) encapsulate link- and sub-frame- specific adaptations (153). This diagram displays a nodal view of the process with the operation within a particular TDD subframe depending on whether the node is in transmitting (155) or receiving (157) mode.

In contrast, FIG. 13 describes the process flow for a WECN using embedded invariance from a link view (essentially connecting the embedding (158) and de-embedding (159) sub-phases of FIG. 12, from different nodes). The rapid differentiation and discarding of received packets without embedded structure (171), and the incorporation of network-control and synchronization data in a feedback cycle (173) of the preferred embodiment are amongst the inventions advantages over the prior art.

Figure 14:
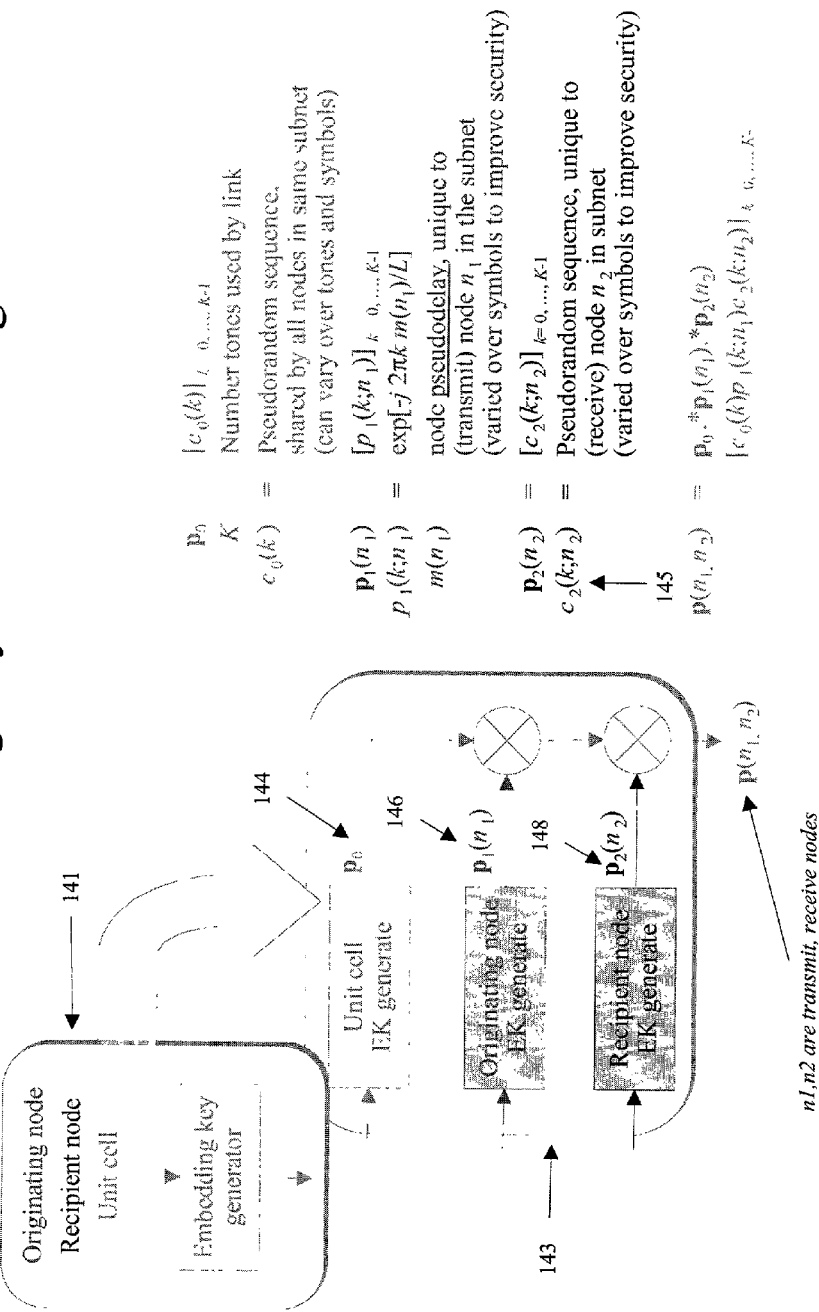
FIG. 14 is a Multilink Embedding Key Generation algorithm and approach.

FIG. 14 shows a multi-link, embedding key-generation process and algorithm used by the preferred embodiment, which employs an OFDM or other multitone, symbol-capable approach. (A single-link embedding key-generation alternative is feasible but is not shown.) In a multi-node, multiple-access network there may be multiple connections originating from or to a given node, or there may only be serial communications, and the embedding key must be capable of serving both conditions. The embedding key is generated using information concerning one or more of the originating node, recipient node, and WECN or sub-group channel organization (141), which flows into a embedding key generator (143). The resulting embedding key is in the preferred embodiment further modified by a WECN code mask. This multilayer mask then is used to form an embedding key for that particular signal with a pseudorandom sequence (145) that is shared by all nodes in the same network or group, though the sequence may vary over channels and multitone (MT) symbols to allow further coordination amongst them at the receiving end.

The multilink embedding key has the following attributes: (1) it is different for every signal in the network; and, (2) it is designed as a multiplication of 3 separate sub-keys. Sub-key $p_0$ (144) identifies the network, serving as a cover key that is shared by all nodes in the network (also known as a TRANSEC or transmission security key). Subkey $p_1$ (146) identifies the transmit node. Subkey $p_2$ (148) identifies the authorized recipient node(s) and is another pseudorandom sequence which is a slot-synchronous (as opposed to network) TRANSEC. In the preferred embodiment $p_1$ is a complex sinusoid (or pseudodelay, since in an OFDM environment such is a circular shift as is known in the prior art), or other structure allowing fast identification-processing algorithm at the receiver.

The embedding key and signal are together modified in an element-wise multiplication (typically a matrix operation, embedded in hardware), forming a signal that indexes on the originating node, which in an optional variation includes a nodal pseudodelay, unique to that node in the network or group, which overlay again may vary over channels and frames to improve security. The originating node index overlay is a complex, exponential phase ramping. The combined signal now mixes with a recipient node index, another pseudorandom sequence that is unique to the recipient node, modifying the whole in a second element-wise multiplication. Thus the final embedding key reflects the content signal, modified to uniquely identify both the originating node and its context, and the receiving node and its context, effecting a signal composition that allows the network to communicate the embedding structure through the network from origin to destination regardless of the intervening channels it takes.

Figure 15:
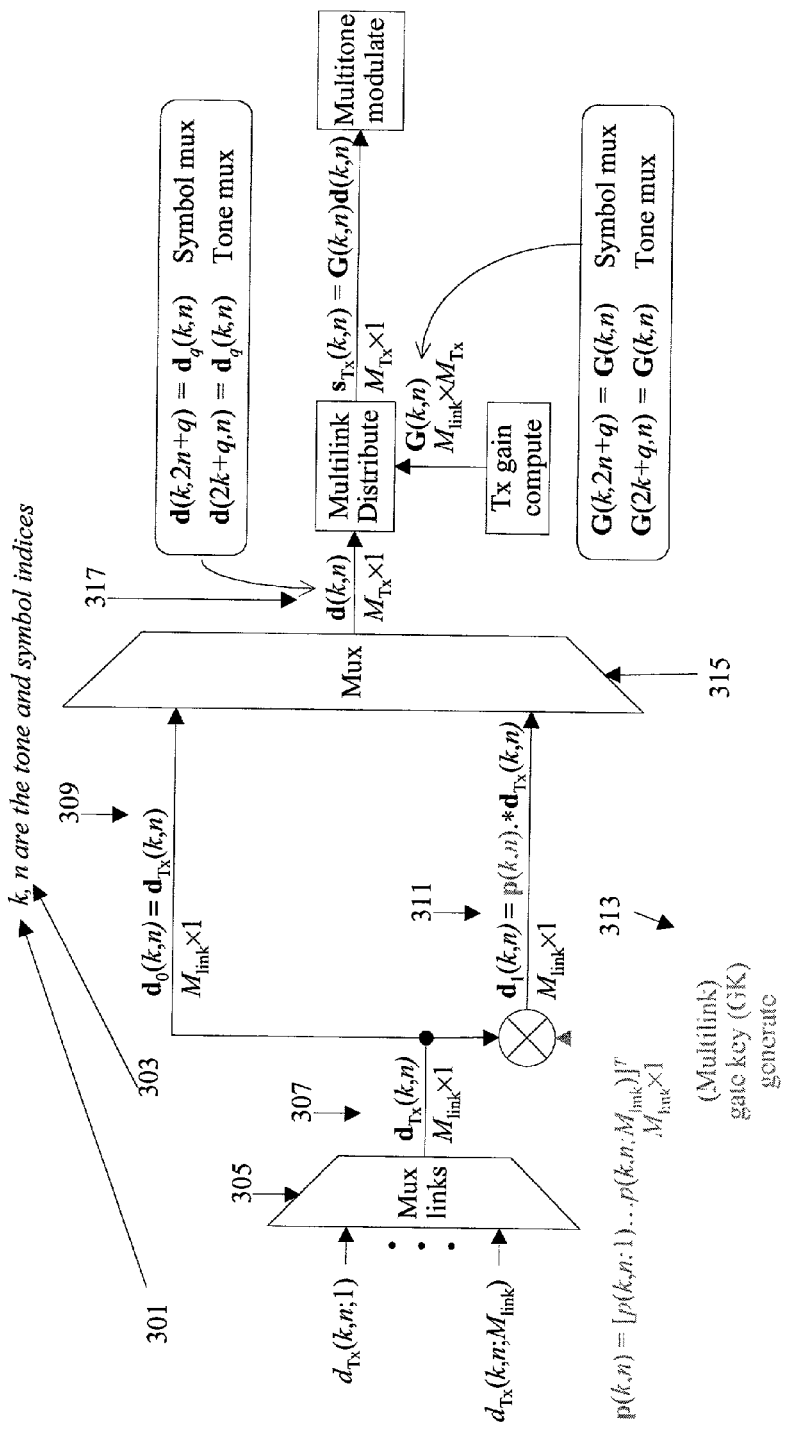
FIG. 15 is of Multilink Transmit Embedding hardware for a given node $n_1$.

FIG. 15 details the preferred embodiment's multilink transmit embedding hardware. At a given transmit node $n_1$ in the network, the intended source data $\{d_{Tx}(k,n;n_2(1)), \ldots, d_{Tx}(k,n;n_2(M_{link}))\}$ for each receive node $\{n_2(1), \ldots, n_2(M_{link})\}$ that the transmit node intends to communicate with over tone k (301) and source slot n (303) is grouped though a multiplexer (305) into an $M_{link} \times 1$ course vector $d_{Tx}(k,n)$ (307)=$[d_{Tx}(k,n;1) \ldots d_{Tx}(k,n;M_{link})]^T$. This vector is then copied onto an unembedded transmission path, forming $d_0(k,n)=d_{Tx}(k,n)$, (309) and an embedded transmission path, forming $d_1(k,n)=p(k,n).*d_{Tx}(k,n)$, (311) where ".*" denotes the element-wise multiply operation, and where $p(k,n)=[p(k,n;n_1,n_2(1)) \ldots p(k,n;n_2(M_{link}))]^T$ is the $M_{link} \times 1$ code key applied to each element of $d_{Tx}(k,n)$ over tone k and source slot n by the multilink gate key generator (313), which in the preferred embodiment uses the means described above and in FIG. 14. Then a multiplexer (315) combines the unembedded and embedded source symbols into data vector d(k,n) (317) using a symbol multiplexing or tone multiplexing operation, respectively by $$d(k,2n+q)=d_q(k,n) \text{ for Symbol multiplexing; and} \quad \text{EQ. 14}$$

$$d(2k+q,n)=d_q(k,n) \text{ for Tone multiplexing,} \quad \text{EQ. 15}$$

such that $d_0(k,n)$ and $d_1(k,n)$ are time-interleaved onto even and odd time slots if symbol multiplexing is performed, and $d_0(k,n)$ and $d_1(kn)$ are tone-interleaved onto even and odd tone indices if tone multiplexing is performed. Symbol multiplexing implements the time-slot embedding procedure described in FIG. 3, and is the preferred embodiment in fixed or slowly-time-varying networks, where the channel response is nearly invariant between multitone symbols. Tone multiplexing, however, is preferred in applications where the higher efficiency obtained by performing multitone modulation over greater numbers of tones (assuming the same value of cyclic prefix) outweighs the slight differences between channel response at even and odd tone values. Tone multiplexing also provides an additional advantage at the receiver, since the phase-shift estimate $\phi(k,n)$ is proportional to the observed channel group delay in this case, and can therefore be used to provide fine synchronization of symbol timing in downstream data decoding operations. The hardware in the preferred embodiment also includes elements which can perform multilink distribution, transmission gain computation, and multitone modulation for environmental adaptation.

Figure 16:
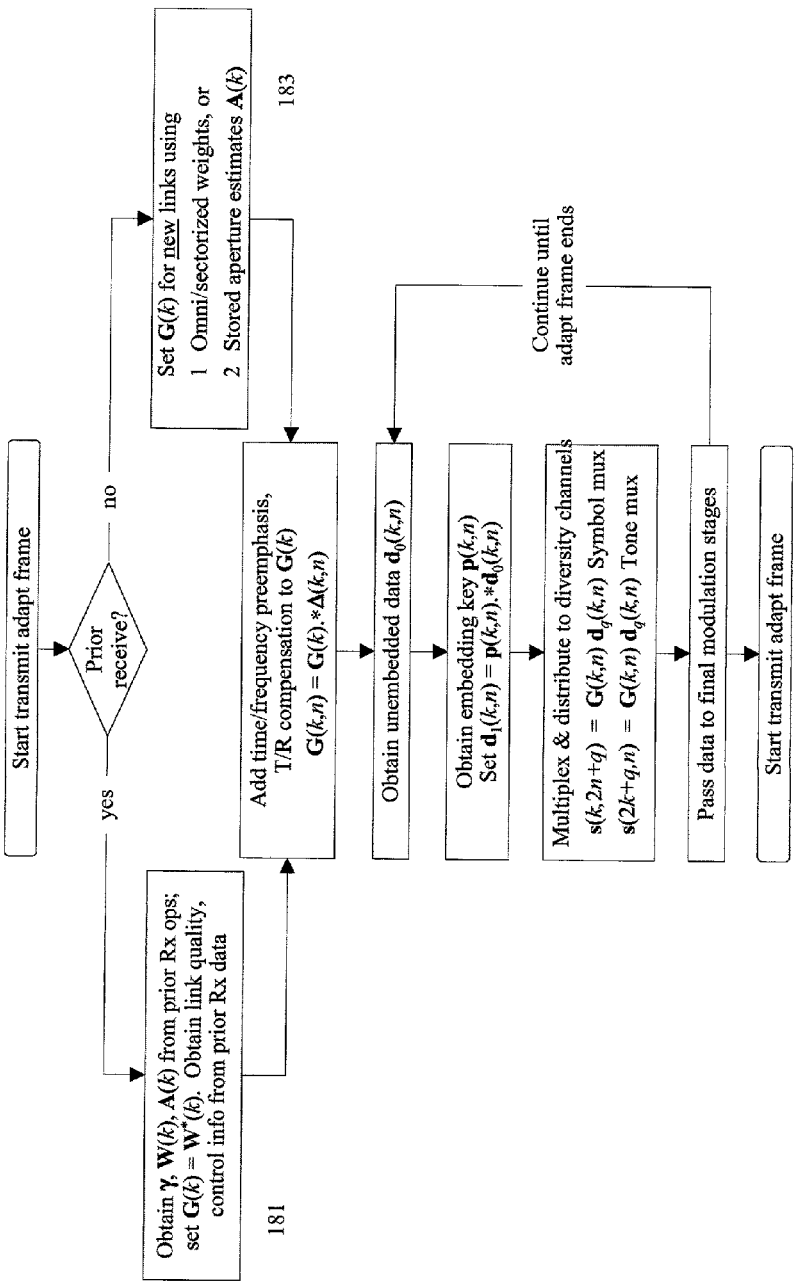
FIG. 16 is a flowchart of a Multilink Embedding Flow diagram.

FIG. 16 diagrams the process of Multilink Embedding within a transmitting node where, after the initialization effort to account for presumed (for initial transmissions) (181) or detected (for transmissions subsequent to feedback) (183) environmental context, the unembedded data is joined with the embedding key, then coded, modulated, and distributed amongst the diversity transmission channels and transmitted. The additional network-level adaptations shown in FIG. 9 can be implemented but are not shown here.

Figure 17:
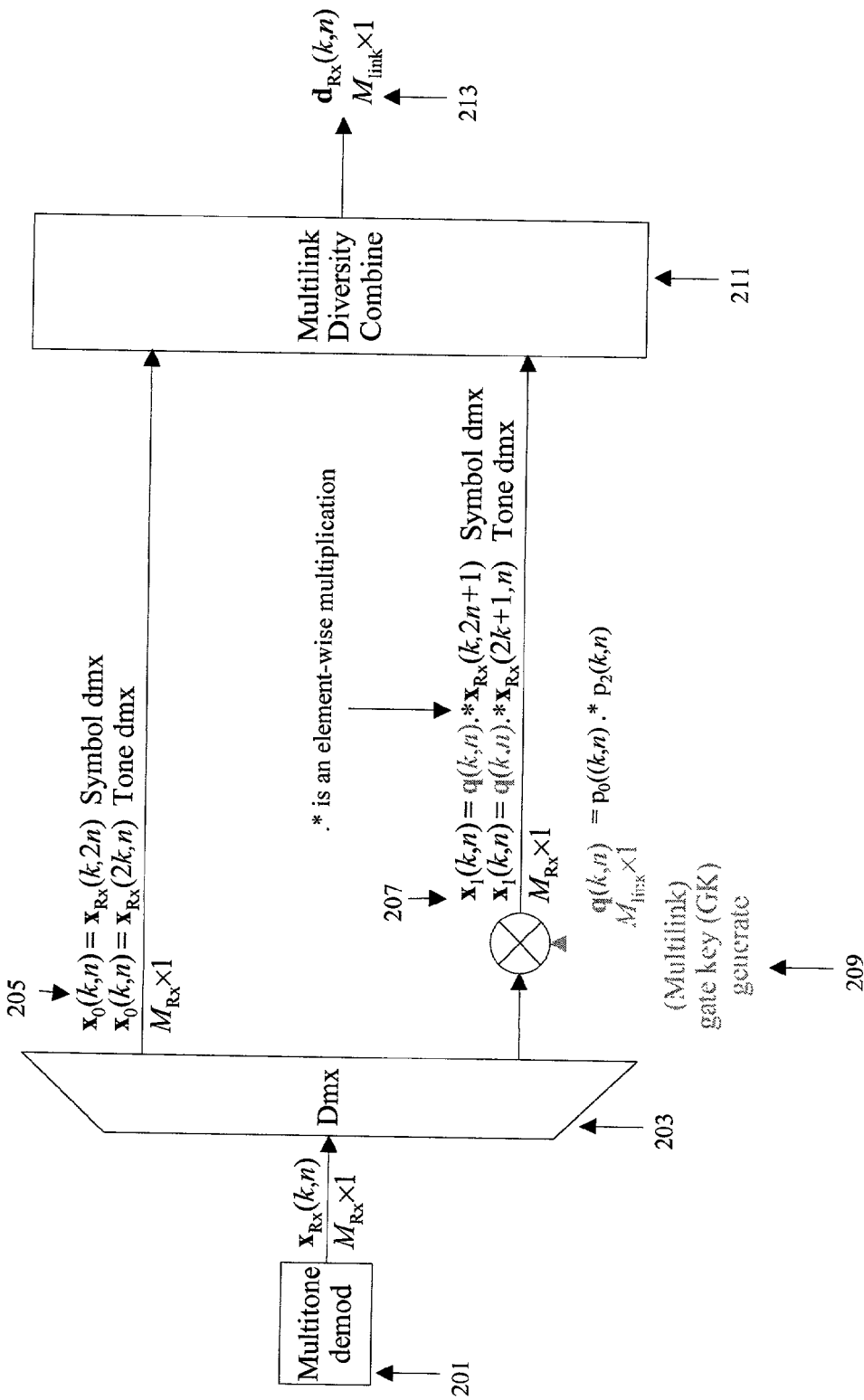
FIG. 17 is of Multilink Receive Embedding Hardware for de-embedding and differentiating intentional signals only at intended recipient links.

FIG. 17 shows a hardware implementation of part of the preferred embodiment's multilink embedding, required for differentiation (and subsequent decoding and full reception) of intended signals within the network from signals within the network not meant to be received by that particular node. A received possible signal is passed through a multitone demodulater (201) and then a demultiplexer (203), which separates it into its component $x_0$ (205) and $x_1$ (207) elements, the latter having the embedded structure. The $x_1$ element then has the $p_0$ (network) and $p_2$ (recipient node) subkeys removed through the multi-link gate key hardware (209). Presuming the resulting $x_0$ and $x_1$ elements have sufficient correlation, indicating that they are not differentiated by a distinct recipient node subkey, they are then passed through a multilink diversity combiner (211) to produce the signal data $d_{Rx}(kn)$ (213).

FIG. 18 diagrams the process within a multilink receiver. This is more complex than the process needed for single-link communications, because signals transmitted within the WECN may be received by nodes for whom they are not intended, and these must be differentiated and ignored as environmental 'noise' even though they possess proper network and transmitting node authorizations and embedded structures. The multilink embedding key is applied to strip off the network and receiving node elements, and the resulting partially differentiated result is then demultiplexed into its original and embedded-structure elements. These are then subjected to the matrix operations detailed in the figure, and examined for cross-correlation of the universe of possible embeddings (in the preferred embodiment, of pseudodelays). If insufficient correlation is observed the signal is not intended for this node and is ignored; otherwise, the receiver uses the signal to both extract environmental data (to provide feedback within this node and across the link(s)) and to extract the original signal and data.

FIG. 19 shows the link detection and separation operations. The incoming possible signal (221) is passed through the de-embedding demultiplexer (223), whose hardware and operations are detailed in FIGS. 17 and 18. The original data element for an authenticated signal x0 (225) is passed through the adaptation hardware and operations detailed in FIGS. 7 and 8 (227). A Fast-Fourier Transform (FFT) Based Auto-SCORE link detection operation is used over a subset of possibilities in the preferred embodiment. This generates a beamform matrix W and a phase vector $\rho$; this also produces a detection statistic of the number of signals received and detected ($Q_{link}$), which is not necessarily the same as the number of signals ($M_{link}$). Signals with the correct embedded structure will correlate and synchronize into differentiable and distinguishable peaks matching the anticipated pseudodelays, as shown in (229). Once properly differentiated and distinguished, original and embedded-structure elements x0 and x1 are passed through a multilink combiner (231), which performs the operation $W^H(x_0(k,n) + \rho.*x_1(k,n))$ to produce the resulting proper data, $d_{Rx}(k,n)$ (232).

FIG. 20 displays a WECN network, using a TDD embedding (as shown in FIG. 3), which has six nodes (A–F), in which nodes A,C, and E belong to subset (the 'uplink transmit/downlink receive' subset), and nodes B, D, and F belong to a second subset (the 'uplink receive/downlink transmit' subset). This network uses the preferred embodiment, engages in multilink transmissions and receptions, and uses pseudodelay keys and embedded structure to differentiate communications from environmental noise. Node A, which is communicating with nodes B, D, and F, will receive strong responses aligned with three pseudodelays and therefore observe differentiable signal peaks at the appropriate pseudodelay key points for those nodes (A.1, A.2, and A.3 of (321)); Node B, which is communicating with nodes A and C, but also receiving unintended signals from Node E, will only receive strong responses aligned with two pseudodelays and observe differentiable signal peaks at the appropriate pseudodelay key points for the two intended signalers (B.1 and B.2 of (323)), but will not observe a differentiable signal peak at the appropriate pseudodelay key point for the unintentional signals from Node E.

To further enhance the communications link, node A will generate three weighted solutions for its beamforming communications; the first (shown by the darkest pattern) weights heavily towards Node B, but directs nulls towards D and F; the second, (shown with the middling gray pattern), weights heavily towards D, but generates nulls towards B and F; and the third (shown with the lightest gray pattern), weights heavily towards F, but generates nulls towards B and D.

Node B, in turn, has two weighted solutions, both of which generate a null towards the unintended signaler Node E, and otherwise are respectively weighted towards A (dark) and C (light).

Although the present invention has been described chiefly in terms of the presently preferred embodiment, it is to be understood that the disclosure is not to be interpreted as limiting. Various alterations and modifications will no doubt become apparent to those skilled in the art after having read the above disclosure. Such modifications may involve other features and functions which are already known about the design, operation and use of wireless electromagnetic communications networks, and which may be used instead of or in addition to features already described herein. The algorithms and equations herein are not limiting but instructive of the embodiment of the invention, and variations which are readily derived through programming or mathematical transformations which are standard or known to the appropriate art are not excluded by omission. Accordingly, it is intended that the appended claims are interpreted as covering all alterations and modifications as fall within the true spirit and scope of the invention in light of the prior art.

Additionally, although claims have been formulated in this application to particular combinations of elements, it should be understood that the scope of the disclosure of the present application also includes any single novel element or any novel combination of elements disclosed herein, either explicitly or implicitly, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

I claim:

1. A method for enhancing communications in a wireless electromagnetic communications network (WECN) having a set of nodes, comprising:
   forming a communications link between any subset of nodes in said WECN;
   modifying an intentional signal to be transmitted along said communications link by embedding at a transmitting node an invariant structure therein;
   converting said modified intentional signal into analog electromagnetic waves;
   transmitting said analog electromagnetic waves to at least one authorized and intended receiving node;
   detecting said analog electromagnetic waves at said receiving node;
   converting said analog electromagnetic waves into said modified intentional signal at said receiving node;
   differentiating said modified intentional signal from environmental noise through said embedded invariant structure at said authorized and intended receiving node;
   recovering said intentional signal by de-embedding said invariant structure; and,
   repeating until all of the intentional signal has been modified, sent, detected, differentiated, and recovered along said communications link.

2. A method as in claim 1, further comprising:
   using an adaptation algorithm to enable the WECN to dynamically adjust transmissions to account for experienced environmental effects.

3. A method as in claim 1, wherein embedding at a transmitting node an invariant structure therein, and recovering said intentional signal by de-embedding said invariant structure, further comprises:
   using a time-slot embedding approach.

4. A method as in claim 1, wherein embedding at a transmitting node an invariant structure therein, and recovering said intentional signal by de-embedding said invariant structure, further comprises:
   using a delay-invariant embedding approach.

5. A method as in claim 1, wherein embedding at a transmitting node an invariant structure therein, and recovering said intentional signal by de-embedding said invariant structure, further comprises:
   using a frequency-invariant embedding approach.

6. A method as in claim 1, wherein embedding at a transmitting node an invariant structure therein, and recovering said intentional signal by de-embedding said invariant structure, further comprises:
   using any combination of a time-slot embedding, delay-invariant embedding, or frequency-invariant approach.

7. A method as in claim 2, wherein the step of using an adaptation algorithm to enable the WECN to dynamically adjust transmissions to account for experienced environmental effects further comprises:
   using any adaptation algorithm that exploits the high correlation between the embedded and unimbedded signal segments to differentiate between intentional and unintentional signals.

8. A method as in claim 7, wherein the step of using any adaptation algorithm that exploits the high correlation between the embedded and unimbedded signal segments to differentiate between intentional and unintentional signals further comprises:
   using an Auto-SCORE approach.

9. A method as in claim 7, wherein the step of using any adaptation algorithm that exploits the high correlation between the embedded and unimbedded signal segments to differentiate between intentional and unintentional signals further comprises:
   using a Dominant-Mode-Prediction (DMP) approach.

10. A method as in claim 7, wherein the step of using any adaptation algorithm that exploits the high correlation between the embedded and unimbedded signal segments to differentiate between intentional and unintentional signals further comprises:
    determining whether an Auto-SCORE, DMP, or combination approach best meets the current environmental constraints and goals of the WECN for that communications link; and,
    using that approach.

11. A method as in claim 1, wherein the step of embedding at a transmitting node an invariant structure therein further comprises:
    using an embedded-key generation means to create, for said communications link, a uniquely identifiable embedding structure.

12. A method as in claim 11, wherein the step of using an embedded-key generation means to create, for said communications link, a uniquely identifiable embedding structure, further comprises:
    using an environmental condition external to said WECN and detectible at each of the transmitting and receiving nodes, in the origination of said embedded key.

13. A method as in claim 12, wherein said environmental condition external to said WECN further comprises:
    a Global Positioning Satellite, Universal Time Coordinates (GPS-UTC) signal.

14. A method as in claim 1, further comprising:
    exploiting the ability of MIMO internode responses, and the ability to detect and differentiate packets prior to fine synchronization between receiving and transmitting nodes of the WECN, to use previous network-based structural synchronization to a predetermined standard.

15. A method as in claim 1, further comprising:
    exploiting the ability of MIMO internode responses, and the ability to detect, differentiate, and recover packets prior to fine synchronization between receiving and transmitting nodes of the WECN, to use previous network-based structural synchronization to a standard external to the WECN.

16. A method as in claim 14, wherein said ability to detect, differentiate, and recover packets prior to fine synchronization further comprises:

employing directive or retrodirective multielement diversity distribution weights, derived from receive weights, over subsequent transmission intervals, to guide detection, differentiation, and recovery of packets.

17. A method as in claim 15, further comprising:
using said directive or retrodirective multielement diversity distribution weights to permit the source transceivers to direct energy away from jamming emitters, and towards intended receive nodes, thereby providing an additional degree of jam resistance, by allowing reception at increased SINR at the other end of the link.

18. A method as in claim 3, wherein using a time-slot embedding approach further comprises:
gathering source data generated at an intermediate modulation stage into $N_{slot} \times 1$ vectors of data elements, each such vector being denotable by $d_{Tx}(n)$;
transmitting said data elements in a series of sequential timeslots $\{d_{Tx}(n-1), d_{Tx}(n), d_{Tx}(n+1)\}$;
generating an embedded structure;
combining said $d_{Tx}(n)$ and embedded structure in a slot multiplexer by a reversible structural embedding process known to the intended receiver of $d_{Tx}(n)$;
and passing $d_{Tx}(n)$ onto subsequent modulation operations necessary to generate the RF transmitted signal waveform.

19. A method as in claim 16, wherein the step of generating an embedded structure further comprises:
using a key-generation algorithm for each slot's source data element $d_{Tx}(n)$ based on an element that is known at both ends of the communications link.

20. A method as in claim 17, wherein said element that is known at both ends of the communications link is a Time-of-Day (TOD) in GPS Universal Time Coordinates (GPS-UTC).

21. A method for enhancing communications in a wireless electromagnetic communications network (WECN) having a set of nodes, comprising:
forming one or more communications links between a first node and at least a second node and a third node, within a subset of nodes in said WECN;
modifying an intentional signal to be transmitted along said communications link by embedding at a transmitting node an invariant structure therein;
converting said modified intentional signal into analog electromagnetic waves;
transmitting said analog electromagnetic waves to at least one authorized and intended receiving node;
detecting said analog electromagnetic waves at said receiving node;
converting said analog electromagnetic waves into said modified intentional signal at said receiving node;
differentiating said modified intentional signal from environmental noise through said embedded invariant structure at said authorized and intended receiving node;
recovering said intentional signal by de-embedding said invariant structure; and,
repeating until all of the intentional signal has been modified, sent, detected, differentiated, and recovered along said communications link.

22. A method for enhancing communications in a wireless electromagnetic communications network (WECN) having a set of nodes, comprising:
forming a communications link between any subset of nodes in said WECN;
modifying an intentional signal to be transmitted along said communications link by embedding it, at a transmitting node, into an invariant structure;
converting said modified intentional signal into analog electromagnetic waves;
transmitting said analog electromagnetic waves to at least one authorized and intended receiving node;
detecting said analog electromagnetic waves at said receiving node;
converting said analog electromagnetic waves into said modified intentional signal at said receiving node;
differentiating, at said authorized and intended receiving node, said modified intentional signal from environmental noise through said invariant structure into which it was embedded;
recovering said intentional signal by de-embedding said invariant structure; and,
repeating until all of the intentional signal has been modified, sent, detected, differentiated, and recovered along said communications link.

23. A method as in claim 20, wherein the step of modifying an intentional signal to be transmitted along said communications link by embedding it, at a transmitting node, into an invariant structure, further comprises any embedding operation that projects said intentional signal onto linear subspace known at both ends of said communications link.

24. A method as in claim 20, wherein the step of modifying an intentional signal to be transmitted along said communications link by embedding it, at a transmitting node, into an invariant structure, further comprises any embedding operation that projects said intentional signal onto linear subspace estimable at both ends of said communications link.

25. A method as in claim 20, wherein the step of modifying an intentional signal to be transmitted along said communications link by embedding it, at a transmitting node, into an invariant structure, further comprises any embedding operation that allows said intentional signal to be decomposed into highly correlated segments after known processing operations feasible at the receiving node.

26. A method as in claim 1, for nodes where the communications link may have significantly changed between a first and second communication events, further comprising:
using fine synchronization that compensates for observed timing and carrier offset between said first and second communication events along said link, to complete demodulation and decoding of the transmitted intentional signal after said intentional signal has been detected, differentiated, and extracted from the noise and interference encountered by the receiving node.

27. An apparatus for enhancing communications in a wireless electromagnetic communications network (WECN), comprising:
a set of transceiving nodes, each node further comprising:
a transmitter of electromagnetic waves;
a receiver of electromagnetic waves;
means for analogue-to-digital, and digital-to-analog, conversion of electromagnetic waves to and from an intentional, orginal digital signal, respectively;
means for embedding into said intentional, orginal digital signal an invariant structure;

means for differentiating a received, intentional, orginal digital signal by detecting the presence or absence in the same of said invariant structure; and, means for recovering from a received digital signal both said invariant structure and said intentional, orginal digital signal.

28. A method as in claim 1, wherein embedding at a transmitting node an invariant structure therein, and recovering said intentional signal by de-embedding said invariant structure, further comprises:

using a tone-multiplexing embedding approach.

29. A method as in claim 11, wherein the step of using an embedded-key generation means to create, for said communications link, a uniquely identifiable embedding structure, further comprises generating a multi-link embedding key using information concerning one or more of the transmitting node, intended receipient node or nodes, and WECN or sub-group channel organization.

30. A method as in claim 27, further comprising:

using said multi-link embedding key at the receiving node, by passing a received possible signal through a multitone demodulater and then a demultiplexer;

separating said received possible signal into its component $x_0$ and $x_1$ elements, the latter having the embedded structure;

modifying the $x_1$ element by removing therefrom the $p_0$ (network) and $p_2$ (recipient node) subkeys;

examining the correlation between the modified $x_1$ element and the $x_0$ element; and, upon finding sufficient correlation, passing the modified $x_1$ element and $x_0$ element through as an intended signal to the multilink diversity combiner (211) to produce the signal data $d_{Rx}(kn)$.

* * * * *